United States Patent
Huynh et al.

(10) Patent No.: US 9,753,441 B2
(45) Date of Patent: Sep. 5, 2017

(54) CONTROLLING DYNAMICAL SYSTEMS WITH BOUNDED PROBABILITY OF FAILURE

(71) Applicant: Massachusetts Institute of Technology, Cambridge, MA (US)

(72) Inventors: Vu Anh Huynh, Cambridge, MA (US); Emilio Frazzoli, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 616 days.

(21) Appl. No.: 14/275,933

(22) Filed: May 13, 2014

(65) Prior Publication Data

US 2014/0336789 A1    Nov. 13, 2014

Related U.S. Application Data

(60) Provisional application No. 61/822,627, filed on May 13, 2013.

(51) Int. Cl.
G05B 13/02    (2006.01)
G05B 13/04    (2006.01)
G05B 23/02    (2006.01)

(52) U.S. Cl.
CPC ......... *G05B 13/04* (2013.01); *G05B 23/0248* (2013.01)

(58) Field of Classification Search
None
See application file for complete search history.

(56) References Cited

U.S. PATENT DOCUMENTS 7,865,089 B2 * 1/2011 Andreoli ............ G06F 11/0733
                                                    369/125
8,346,694 B2 * 1/2013 Dugan ............... G06Q 10/0635
                                                    706/45

(Continued)

FOREIGN PATENT DOCUMENTS

EP         1 426 540 B1    12/2008
WO    WO2013088186 A2     6/2013

OTHER PUBLICATIONS

Dugan et al. "Combining Software Quality Analysis with Dynamic Event/Fault Trees for High Assurance Systems Engineering", 2007 IEEE, pp. 245-255.*

(Continued)

*Primary Examiner* — Van Nguyen
(74) *Attorney, Agent, or Firm* — Peter A. Nieves; Sheehan Phinney Bass & Green PA

(57) ABSTRACT

A computer-based method controls a dynamical system in an uncertain environment within a bounded probability of failure. The dynamical system has a state space and a control space. The method includes diffusing a risk constraint corresponding to the bounded probability of failure into a martingale that represents a level of risk tolerance associated with the dynamical system over time. The state space and the control space of the dynamical system are augmented with the martingale to create an augmented model with an augmented state space and an augmented control space. The method may include iteratively constructing one or more Markov Decision Processes (MDPs), with each iterative MDP represents an incrementally refined model of the dynamical system. The method further includes computing a first solution based on the augmented model or, if additional time was available, based on one of the MDP iterations.

24 Claims, 43 Drawing Sheets

(56) References Cited

U.S. PATENT DOCUMENTS

| | | | | |
|---|---|---|---|---|
| 8,832,497 B2* | 9/2014 | Bluvband | .......... | G05B 23/0248 |
| | | | | 714/26 |
| 8,938,405 B2* | 1/2015 | Pinhanez | ............. | G06Q 10/101 |
| | | | | 706/12 |
| 9,058,568 B2* | 6/2015 | Hosking | ............ | G06Q 10/0635 |
| 9,059,817 B2* | 6/2015 | Huang | ................ | H04L 1/0009 |
| 9,122,253 B2* | 9/2015 | Block | ...................... | G05B 9/02 |
| 9,158,303 B2* | 10/2015 | Mazzaro | ............ | G05B 23/0251 |

OTHER PUBLICATIONS

Dehlinger et al. "Analyzing Dynamic Fault Trees Derived From Model-Based System Architectures", 2008, pp. 365-374.*

Huynh et al. "A Martingale Approach and Time-Consistent Sampling-based Algorithms for Risk Management in Stochastic Optimal Control", 2014 IEEE, pp. 1858-1865.*

Yang et al. "Automatic Generation of Markov Models in Safety Instrumented Systems With Non-Identical Channels", 2010 IEEE, pp. 287-290.*

Bruno Bouchard; Marcel Nutz; "Weak Dynamic Programming for Generalized State Constraints"; SIAM Journal on Control and Optimization, vol. 50, No. 6, pp. 3344-3373, 2012; Oct. 19, 2012.

Nizar Touzi; Optimal Stochastic Control, Stochastic Target Problems, and Backward SDE: 1st Edition; Springer New York; Sep. 2012, chapters 4-6.

Sertac Karaman; Emilio Frazzoli; "Sampling-based Algorithms for Optimal Motion Planning"; The International Journal of Robotics Research Jun. 2011 vol. 30 No. 7 846-894.

* cited by examiner

Algorithm 1: Risk Constrained iMDP()

1  $(S_0, \bar{S}_0, J_0, \gamma_0, \Upsilon_0, J_0^T, \mu_0, \kappa_0, \Delta t_0, \overline{\Delta t_0}) \leftarrow (\emptyset, \emptyset, \emptyset, \emptyset, \emptyset, \emptyset, \emptyset, \emptyset, \emptyset, \emptyset)$;
2  for $n = 1 \to N$ do
3     UpdateDataStorage$(n-1, n)$ ;
4     SampleOnBoundary$(n)$ ;
    // $K_{1,n} \geq 1$ rounds to construct boundary conditions
5     for $i = 1 \to K_{1,n}$ do
6        ConstructBoundary$(S_n, \bar{S}_n, J_n, \gamma_n, \Upsilon_n, J_n^T, \mu_n, \Delta t_n)$ ;
    // $K_{2,n} \geq 0$ rounds to process the interior region
7     for $i = 1 \to K_{2,n}$ do
8        ProcessInterior$(S_n, \bar{S}_n, J_n, \gamma_n, \Upsilon_n, J_n^T, \mu_n, \kappa_n, \overline{\Delta t_n})$;

FIG. 4A

```
Algorithm 2: ConstructBoundary($S_n, \bar{S}_n, J_n, \gamma_n, \Upsilon_n, J_n^\tau, \mu_n, \Delta t_n$)
1  $z_s \leftarrow$ Sample($S$) ;
2  $z_{near} \leftarrow$ Nearest($z_s, S_n, 1$) ;
3  if ($x_e, u_e, \tau$) $\leftarrow$ ExtBackwardsS($z_{near}, z_s, T_0$) then
4      $z_n \leftarrow x_e(0)$;
5      $ic = \tau g(z_e, u_e) + \alpha^\tau J_n(z_{near}, 1)$;
6      $ic^\tau = \tau g(z_e, u_e) + \alpha^\tau J_n^\tau(z_{near})$;
7      ($S_n, \bar{S}_n, J_n(z_e, 1), \gamma_n(z_e), \Upsilon_n(z_e), J_n^\tau(z_e), \mu_n(z_e, 1), \Delta t_n(z_e)$) $\leftarrow$
         ($S_n \cup \{z_e\}, \bar{S}_n \cup \{(z_e, 1)\}, ic, \gamma_n(z_{near}), \Upsilon_n(z_{near}), ic^\tau, u_e, \tau$) ;
      // Perform $L_n \geq 1$ updates
8      for $i = 1 \to L_n$ do
          // Choose $\mathcal{K}_n = \Theta(|S_n|^\theta) < |S_n|$ states
9          $Z_{update} \leftarrow$ Nearest($z_e, S_n \setminus \partial S_n, \mathcal{K}_n$) $\cup \{z_e\}$;
10         for $z \in Z_{update}$ do
11             UpdateS($z, S_n, J_n, \gamma_n, \Upsilon_n, J_n^\tau, \mu_n, \Delta t_n$) ;
```

FIG. 4B

```
Algorithm 3: ProcessInterior($S_n, \bar{S}_n, J_n, \gamma_n, \Upsilon_n, J_n^\circ, \mu_n, \kappa_n, \overline{\Delta t}_n$)
1  $\bar{z}_e = (z_e, q_e) \leftarrow$ Sample($\bar{S}$);
2  $\bar{z}_{near} = (z_{near}, q_{near}) \leftarrow$ Nearest($\bar{z}_e, \bar{S}_n, 1$);
3  if $(x_e, q_e, u_e, \tau) \leftarrow$ ExtBackwardsSM($\bar{z}_{near}, \bar{z}_e, T_0$) then
4  |    $\bar{z}_e \leftarrow (x_e(0), q_e)$;
5  |    if $q_e < \gamma_n(z_{near})$ then
       |        // C takes a large value
6  |    |        $(\bar{S}_n, J_n(\bar{z}_e), \mu_n(\bar{z}_e), \kappa_n(\bar{z}_e), \overline{\Delta t}_n(\bar{z}_e)) \leftarrow (\bar{S}_n \cup \{\bar{z}_e\}, C, u_e, 0, \tau)$ ;
7  |    else
8  |    |        $ic = \tau g(z_e, u_e) + \alpha^\tau J_n(\bar{z}_{near})$;
9  |    |        $(\bar{S}_n, J_n(\bar{z}_e), \mu_n(\bar{z}_e), \kappa_n(\bar{z}_e), \overline{\Delta t}_n(\bar{z}_e)) \leftarrow (\bar{S}_n \cup \{\bar{z}_e\}, ic, u_e, 0, \tau)$ ;
       |    // Perform $\bar{L}_n \geq 1$ updates
10 |    for $i = 1 \to \bar{L}_n$ do
       |        // Choose $\bar{K}_n = \Theta(|\bar{S}_n|^\rho) < |\bar{S}_n|$ states
11 |    |        $\bar{Z}_{update} \leftarrow$ Nearest($\bar{z}_e, \bar{S}_n \setminus \partial \bar{S}_n, \bar{K}_n) \cup \{\bar{z}_e\}$;
12 |    |        for $\bar{z} = (z, q) \in \bar{Z}_{update}$ do
13 |    |        |    UpdateSM($\bar{z}, \bar{S}_n, J_n, \gamma_n, \Upsilon_n, J_n^\circ, \mu_n, \kappa_n, \overline{\Delta t}_n$);
```

FIG. 4C

```
Algorithm 4: UpdateS(z, S_n, J_n, γ_n, Υ_n, J_n^Γ, μ_n, Δt_n)
1  τ ← ComputeHoldingTime(z, |S_n|, d_v);
   // Sample or discover M_n = Θ(log(|S_n|)) controls
2  U_n ← ConstructControlsS(M_n, z, S_n, τ);
3  for v ∈ U_n do
4  |   (Z_near, P_n) ← ComputeTranProb(z, v, τ, S_n, f, F);
   |   // Update cost
5  |   J ← τg(z, v) + α^τ Σ_{y∈Z_near} P_n(y)J_n(y, 1);
6  |   if J < J_n(z, 1) then
7  |   |   p ← Σ_{y∈Z_near} P_n(y)Υ_n(y);
8  |   |_ (J_n(z, 1), Υ_n(z), μ_n(z, 1), Δt_n(z)) ← (J, p, v, τ);
   |   // Update min-failure probability
9  |   b ← Σ_{y∈Z_near} P_n(y)γ_n(y);
10 |   if b < γ_n(z) then
11 |   |   J ← τg(z, v) + α^τ Σ_{y∈Z_near} P_n(y)J_n^Γ(y);
12 |   |_ (γ_n(z), J_n^Γ(z)) ← (b, J);
```

FIG. 4D

Algorithm 5: UpdateSM($\bar{z} = (z, q), \bar{S}_n, J_n, \gamma_n, \Upsilon_n, J_n^u, \mu_n, \kappa_n, \overline{\Delta t}_n$)

1    $\bar{\tau} \leftarrow$ ComputeHoldingTime($\bar{z}, |\bar{S}_n|, d_q + 1$);
     // Sample or discover $\overline{M}_n = \Theta(\log(|\bar{S}_n|))$ controls
2    $\overline{U}_n \leftarrow$ ConstructControlsSM($\overline{M}_n, \bar{z}, \bar{S}_n, \bar{\tau}$);
3    for $\bar{v} = (v, c) \in \overline{U}_n$ do
4        ($\overline{Z}_{near}, \overline{P}_n$) $\leftarrow$ ComputeTranProb($\bar{z}, \bar{v}, \bar{\tau}, \bar{S}_n, \bar{J}, \bar{P}$);
5        $J \leftarrow \tau g(z, v) + \alpha^\tau \sum_{\bar{y}=(y,s) \in \overline{Z}_{near}} \overline{P}_n(\bar{y}) [\mathbf{1}_{s=\gamma_n(y)} J_n^u(y) + \mathbf{1}_{\gamma_n(y) < s < \Upsilon_n(y)} J_n(\bar{y}) + \mathbf{1}_{s \geq \Upsilon_n(y)} J_n(y, 1)]$;
        // Improved cost
6        if $J < J_n(\bar{z})$ then
7           $(J_n(\bar{z}), \mu_n(\bar{z}), \kappa_n(\bar{z}), \overline{\Delta t}_n(\bar{z})) \leftarrow (J, v, c, \tau)$;

FIG. 4E

```
Algorithm 6: Risk Constrained Policy(z̄ = (z,q) ∈ S̄ₙ)
 1  z_nearest ← Nearest(z, Sₙ, 1);
 2  if q ≥ γₙ(z_nearest) then
        // Switch to a deterministic control policy
 3      return (φ(z̄) = (μₙ(z_nearest), 0), Δtₙ(z_nearest)) ;
 4  else
        // Perform a Bellman update to select a control
 5      (J_min, v_min, c_min) ← (+∞, ∅, ∅) ;
 6      τ̄ ← ComputeHoldingTime(z̄, |S̄ₙ|, dₙ + 1);
        // Sample or discover M̄ₙ = Θ(log(|S̄ₙ|)) controls
 7      Ūₙ ← ConstructControlsSM(M̄ₙ, z̄, S̄ₙ, τ̄);
 8      for v̄ = (v,c) ∈ Ūₙ do
 9          (Z̄_near, P̄ₙ) ← ComputeTranProb(z̄, v̄, τ̄, S̄ₙ, J̄, P̄);
10          J ← rg(z,v) + αᵗ Σ_{ȳ=(y,s)∈Z̄_near} P̄ₙ(ȳ)[1_{s=γₙ(y)}Jₙ¹(y) +
                                                          1_{γₙ(y)<s<Γₙ(y)}Jₙ(ȳ)+1_{s≥Γₙ(y)}Jₙ(y,1)];
            // Improved cost
11          if J < J_min then
12              ⌊ (J_min, v_min, c_min) ← (J, v, c) ;
13      return (φ(z̄) = (v,c), τ̄) ;
```

FIG. 4F

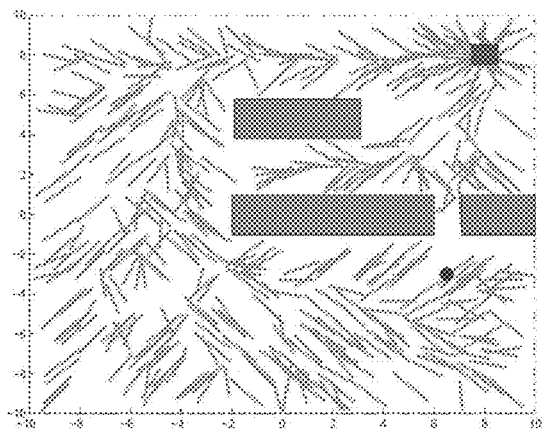 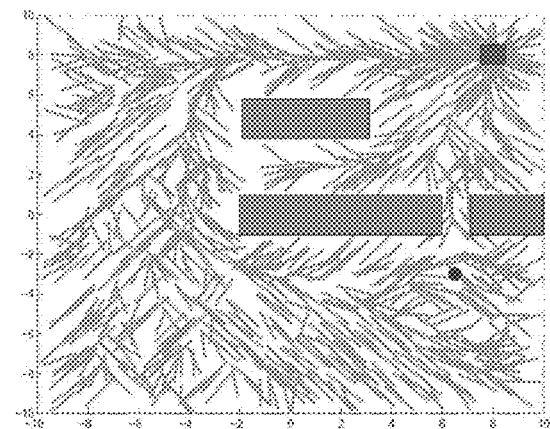
(a) Policy on $\mathcal{M}_{500}$.  (b) Policy on $\mathcal{M}_{1000}$.
FIG. 5A                    FIG. 5B (c) Policy on $\mathcal{M}_{3000}$.

(d) Markov chain implied by $\mathcal{M}_{200}$.

(e) Markov chain implied by $\mathcal{M}_{500}$.

(f) Markov chain implied by $\mathcal{M}_{1000}$.

(a) Policy on $\mathcal{M}_{4000}$.   (b) Value function $J_{4000,1.0}$.

(c) Collision probability $\Upsilon_{4000}$.

(d) Policy map induced by $\gamma_{4000}$.  (e) Value function $J^\gamma_{4000}$.

(c) Policy on $\overline{\mathcal{M}_{3000}}\backslash\mathcal{M}_{3000}$: Top-down view

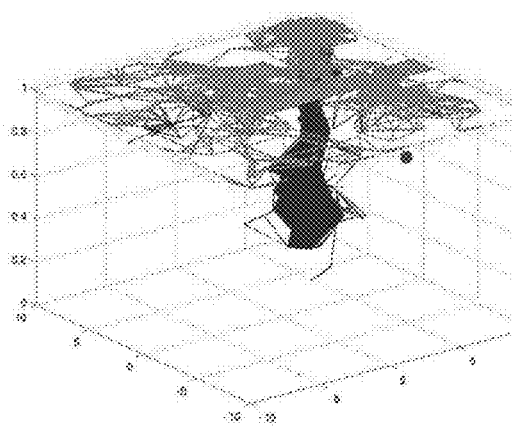 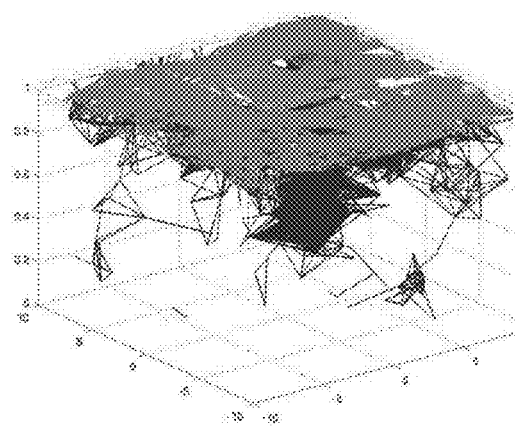
(d) Markov chain implied by $\overline{\mathcal{M}}_{200}$.
(e) Markov chain implied by $\overline{\mathcal{M}}_{500}$.
FIG. 7D
FIG. 7E (f) Markov chain implied by $\overline{\mathcal{M}}_{1000}$.

(a) Value function $J_{200,1.0}$.  (b) Value function $J_{2000,1.0}$.

(c) Value function $J_{4000,1.0}$.

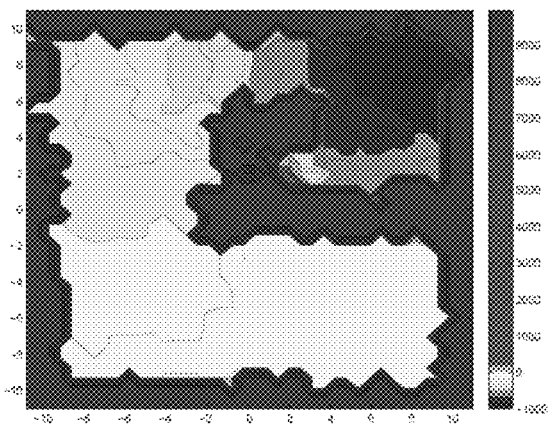 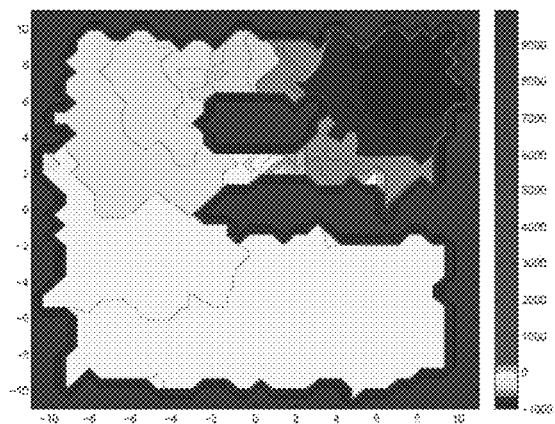
(d) Value function $J_{4000,0.1}$         (e) Value function $J_{4000,0.5}$
FIG. 8D                    FIG. 8E (f) Value function $J_{4000,0.9}$ (a) Unconstrained problem trajectories: simulated collision probability 49.27%, average cost −125.20.

(b) Min-collision trajectories: simulated collision probability 0%, average cost −17.85.

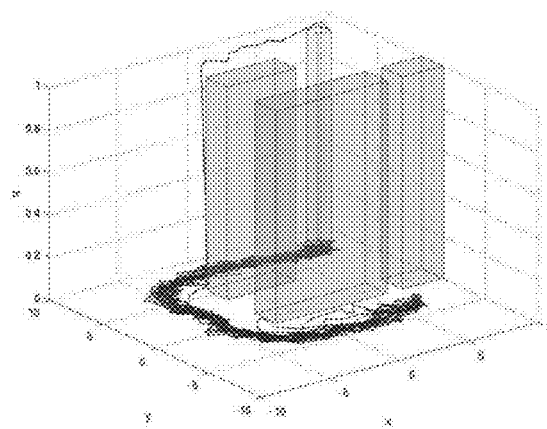 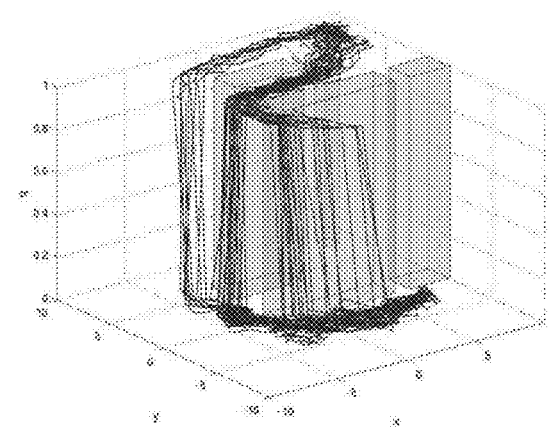
(a) Threshold $\eta = 0.01$.  (b) Threshold $\eta = 0.05$.
FIG. 11 A    FIG. 11 B (c) Threshold $\eta = 0.10$.

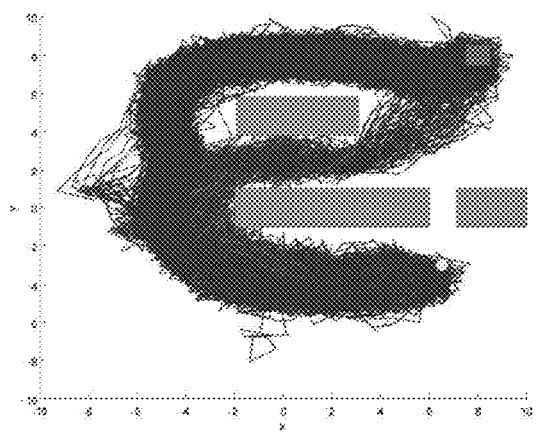 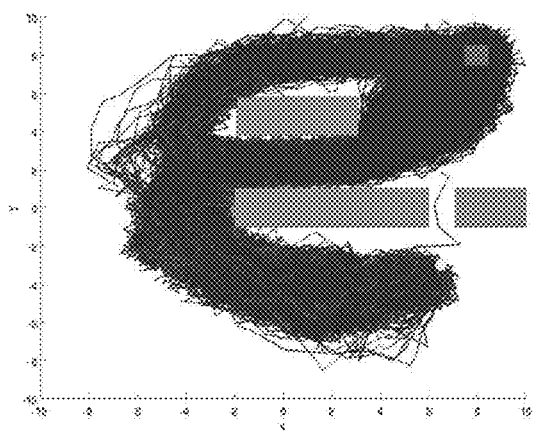
(d) $\eta = 0.01$: 0.8%, −19.42.  (e) $\eta = 0.05$: 4.2%, −42.53.
FIG. 11 D    FIG. 11 E (f) $\eta = 0.10$: 10%, −58.00

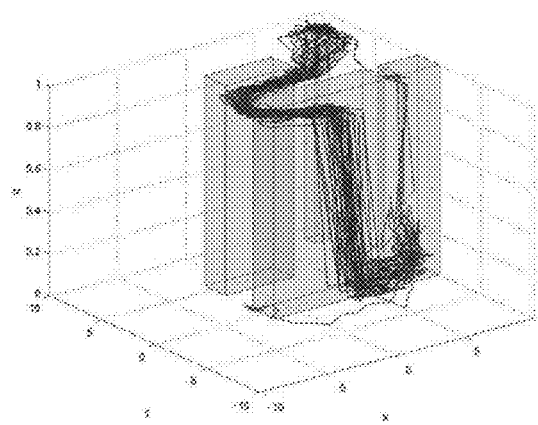 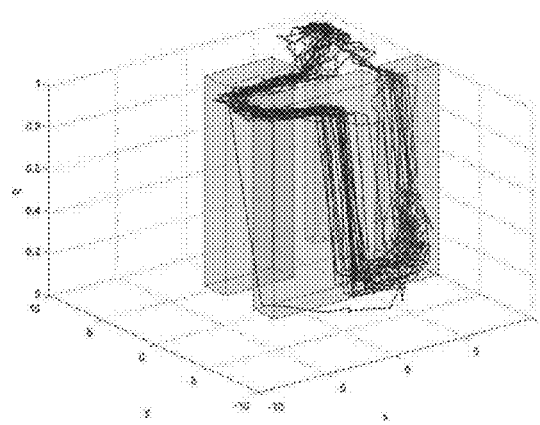
(g) Threshold $\eta = 0.2$.　　(h) Threshold $\eta = 0.3$.
FIG. 11 G　　　　　　FIG. 11 H (i) Threshold $\eta = 0.4$.

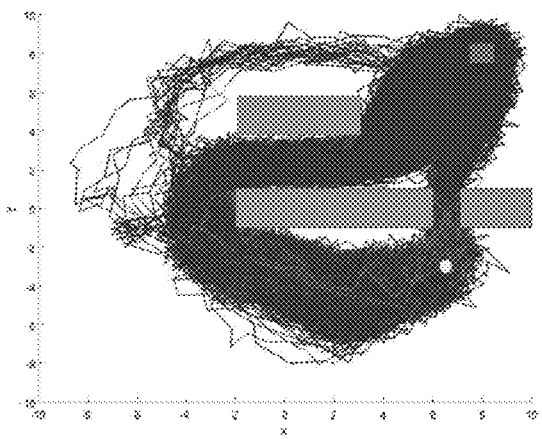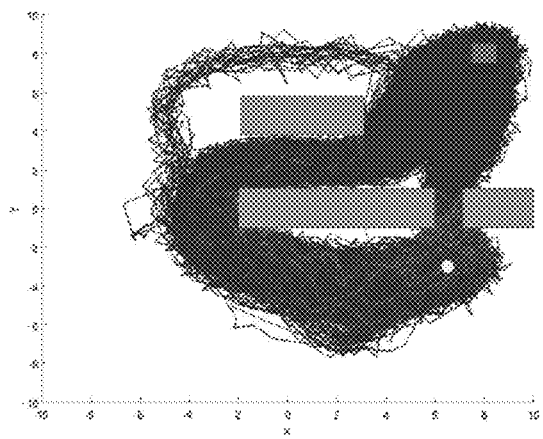
(j) $\eta = 0.2$: 15.6%, −65.81.　　(k) $\eta = 0.3$: 28.10%, −76.80.
FIG. 11 J　　　　　　　　FIG. 11 K (l) $\eta = 0.4$: 40%, −115.59.

CONTROLLING DYNAMICAL SYSTEMS WITH BOUNDED PROBABILITY OF FAILURE

CROSS-REFERENCE TO RELATED APPLICATION(S)

This application claims the benefit of U.S. Provisional Application No. 61/822,627, filed May 13, 2013 and entitled A Real-Time Method for Controlling Dynamical Systems with Bounded Probability of Failure. The disclosure of the prior application is incorporated herein by reference in its entirety.

GOVERNMENT LICENSE RIGHTS

This invention was made with government support under Contract No. W911NF-11-1-0046 awarded by the Army Research Office and under Grant No. CNS-1016213 awarded by the National Science Foundation. The Government has certain rights in the invention.

FIELD OF THE INVENTION

This disclosure relates to controlling dynamical systems with a bounded probability of failure and, more particularly, relates to systems and methods for implementing such control.

BACKGROUND

Controlling dynamical systems in uncertain environments is a fundamental and essential problem in several fields, ranging from robotics, to healthcare, to management, to science, to economics and to finance. Given a system with dynamics described, for example, by a controlled diffusion process, a stochastic optimal control problem is to find an optimal feedback policy to optimize an objective function. Risk management has always been an important part of stochastic optimal control problems to guarantee or optimize the likelihood of safety during the execution of control policies. For instance, in self-driving car applications, it is desirable that autonomous cars depart from origins to reach destinations with minimum energy and at the same time maintain bounded probability of collision. Ensuring such performance is critical before deploying autonomous cars in real life.

SUMMARY OF THE INVENTION

In one aspect, a computer-based method (e.g., a computer-implemented method) controls a dynamical system in an uncertain environment within a bounded probability of failure. The dynamical system has a state space and a control space. The method includes diffusing a risk constraint corresponding to the bounded probability of failure into a martingale that represents a level of risk tolerance associated with the dynamical system over time. The state space and the control space of the dynamical system are augmented with the martingale to create an augmented model with an augmented state space and an augmented control space. The method may include iteratively constructing one or more Markov Decision Processes (MDPs), with each iterative MDP represents an incrementally refined model of the dynamical system. The method further includes computing a first solution based on the augmented model or, if additional time was available, based on one of the MDP iterations.

Computer-based systems and non-transitory, computer-readable medium that stores instructions executable by a computer-based processor to perform implementations of this method are disclosed as well.

In some implementations, one or more of the following advantages are present.

Real-time, efficient, and highly effective control can be provided to a dynamical system operating in an uncertain environment to maintain a bounded probability of failure.

Other features and advantages will be apparent from the description and drawings, and from the claims.

BRIEF DESCRIPTION OF THE DRAWINGS

FIGS. 4A-4F are exemplary algorithms that may be implemented by or underlie functionality of the computer-based processing system of FIGS. 1 and 2.

FIGS. 5(a)-5(f) are policy maps and Markov chains of a system with stochastic single integrator dynamics in a cluttered and uncertain environment.

FIGS. 7A-7(f) are policy maps and Markov chains in an augmented state space.

FIGS. 8(a)-8(f) are schematic representations showing various incremental value functions over iterations.

Like reference characters may refer to like elements.

DETAILED DESCRIPTION

Figure 1:
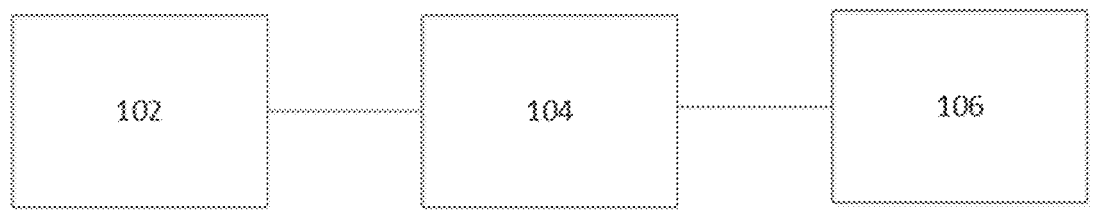
FIG. 1 is a schematic diagram of an exemplary dynamical system, operatively coupled to a computer-based controller, which is operatively coupled to a computer-based processing system.

FIG. 1 is a schematic diagram of a dynamical system 102, operatively coupled to a computer-based controller 104 for the dynamical system 102. The computer-based controller 104 is operatively coupled to a computer-based processing system 106.

The dynamical system 102 can represent virtually any kind of system that can be represented with a state space and a control space that evolve over time. In general, a state space includes all (or a large number) of the possible states that the dynamical system 102 can experience and a control space includes all (or a large number) of the possible control variable values for controlling the dynamical system 102. In exemplary embodiments, the dynamical system 102 can represent an autonomous or semi-autonomous car (e.g., one with autonomous parking functionality). In that example, the state space might include all of the possible locations, speeds, accelerations, etc. of the car and the control space might include all of the possible control inputs (e.g., go faster, slow down, turn left, turn right, stop, etc.) for the car.

Other examples of dynamical systems include unmanned aerial vehicles, aircraft flight controllers, robotic motion planning and control systems, robotic manipulator control systems, steerable needles, robotic surgical systems, high frequency trading and algorithmic hedge fund platforms, or the like.

In general, the computer-based controller 104 is adapted to control the dynamical system 102. It can do so within a bounded probability of failure, even in the presence of disturbances that may arise, for example, as a result of operating in the uncertain environment. As discussed herein, the computer-based controller 104 accomplishes this, with the assistance of the computer-based processing system 106, in a high-speed, resource-efficient manner that is particularly well-suited to be applied in uncertain environments with disturbances that may require a rapid, yet sufficiently accurate response. Moreover, the computer-based controller 104 accomplishes this, with the assistance of the computer-based processing system 106 while maintaining the probability of failure of the dynamical system 102 within certain boundaries.

The concept of failure in the dynamical system 102 can be defined in a number of ways. According to one definition, a failure occurs in the dynamical system any time that the dynamical system enters some state that is deemed unacceptable (e.g., by a human observer). For example, in the robotics industry, a dynamical system (e.g., a semiautonomous car) may be considered to have failed if the semiautonomous car has collided with an obstacle (e.g., a street sign or a parked car). As another example, in the financial industry, a dynamical system (e.g., a financial portfolio) may be considered to have failed if the financial value of the financial portfolio has fallen below some minimally acceptable threshold. Bounding the probability of these kinds of failures generally helps to ensure safe and desirable operation of different types of dynamical system 102.

There are a number of possible disturbances that could arise, particularly in an uncertain environment that could, at least potentially, result in some kind of failure in a dynamical system. Some examples include: (i) an imperfect car engine that could disrupt the car's ability to operate precisely in accordance with a particular control input, (ii) a rough driving road that could disrupt a car's ability to operate precisely in accordance with a particular control input, or (iii) a volatile financial market condition that could disturb the ability of financial software to perform in accordance with its intended functionality. When facing these types of disturbances, the performance of a dynamical system can become quite random, potentially resulting in a failure. It is generally desirable to minimize this randomness and, if possible, bounding the probability of a failure in some way, that may be, for example, in accordance with specifications provided by a human system operator or the like. In a typical implementation, the computer-based controller 104, with assistance from the computer-based processing system 106, is adapted to control the dynamical system in a manner that will maintain the probability of failure for the dynamical system 102 within any such boundaries.

At a very high level, the computer-based controller 104 and computer-based processing system 106 provide control over the dynamical system 102 by constructing a model of the dynamical system 102 based on a variety of information about the dynamical system 102 itself, about a human operator's operating instructions for the dynamical system 102, about a risk constraint that represents a bounded probability of failure for the dynamical system 102, and/or about the environment within which the dynamical system 102 is operating. As described herein, the computer-based controller 104 and computer-based processing system 106 iteratively refine the system model based, among other things, on additional information provided to the computer-based controller 104 and computer-based processing system 106, as it becomes available. The computer-based controller 104 and computer-based processing system 106 periodically return control signals based on the latest iteration of the system model.

Figure 2:
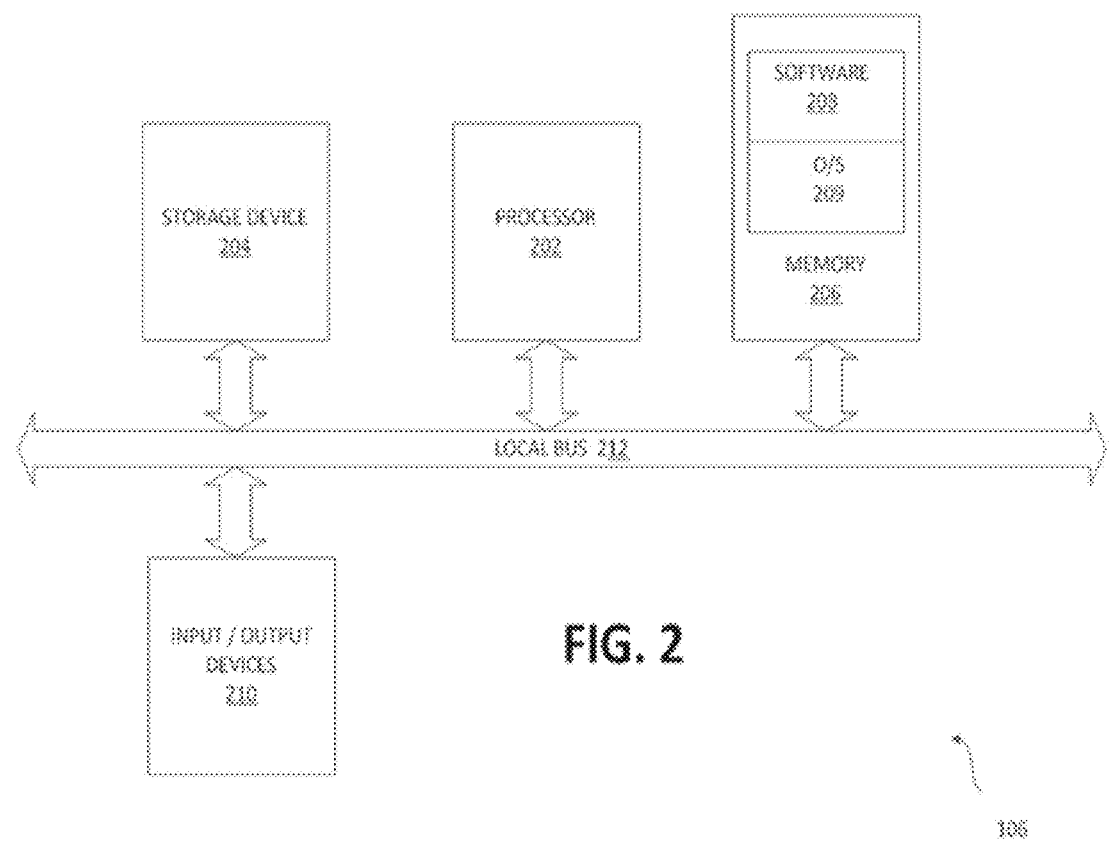
FIG. 2 is a schematic diagram of an exemplary computer-based processing system from FIG. 1.

FIG. 2 is a schematic diagram illustrating an example of the computer-based processing system 106 in FIG. 1.

In general, the illustrated computer-based processing system 106 is configured to execute and/or facilitate one or more of the system functionalities described herein. More particularly, the illustrated computer-based processing system 106 is configured to perform the processing functionality described herein and return control signals, as appropriate, to the computer-based controller 104.

The illustrated computer-based processing system 106 has a processor 202, a storage device 204, a memory 206 having software 208 stored therein that, when executed by the processor, causes the processor to perform or facilitate one or more of the functionalities described herein, input and output (I/O) devices 210 (or peripherals), and a local bus, or local interface 212 allowing for communication within the controller 104. The local interface 212 can be, for example, one or more buses or other wired or wireless connections. The controller 104 may include other elements not specifically shown in the illustrated implementation. These can include, for example, controllers, buffers (caches), drivers, repeaters, receivers, etc. Furthermore, the local interface 212 can include address, control, and/or data connections to enable appropriate communications among the illustrated components.

The illustrated processor 202 is a hardware device for executing software, particularly that stored in the memory 206, and for performing processing in accordance with the software. The processor 202 can be any custom made or commercially available processor. It can be a single core or multi-core processor, a central processing unit (CPU), an auxiliary processor among several processors, a combination of discrete processors associated with the present controller 104, a semiconductor based microprocessor (in the form of a microchip or chip set), a macroprocessor, or generally any device for executing software instructions and/or processing data.

The illustrated memory 206 is a hardware device as well and can be virtually any type of computer-based memory. Examples include any one or combination of volatile memory elements (e.g., random access memory (RAM, such as DRAM, SRAM, SDRAM, etc.)) or nonvolatile memory elements (e.g., ROM, hard drive, tape, CDROM, etc.). Moreover, the memory 206 can incorporate electronic, magnetic, optical, and/or other types of storage media. The memory 206 can have a distributed architecture, where various components are situated remotely from one another, but can be accessed by the processor 202.

In general, the software 208 defines various aspects of the controller 104 functionality. The software 208 in the memory 206 may include one or more separate programs, each of which containing an ordered listing of executable instructions for implementing functionality associated with the controller 104, as described herein. The memory 206 may host an operating system (O/S) 520, which would generally control the execution of one or more programs within the controller 104 and provide scheduling, input-output control, file and data management, memory management, communication control, and related services.

The I/O devices 210 can include one or more of virtually any kind of computer-based input or output (I/O) devices. Examples of I/O devices include a keyboard, mouse, scanner, microphone, printer, display, etc. The I/O devices 210 may include one or more devices that communicate via both inputs and outputs, for instance a modulator/demodulator (modem; for accessing another device, system, or network), a radio frequency (RF) or other transceiver, a telephonic interface, a bridge, a router, or other device. In some implementations, certain human users having administrative privileges may access and perform administrative functions associated with the controller 104 through one or more of the I/O devices 210.

In general, when the controller 104 is in operation, the processor 202 executes the software 208 stored within the memory 206, communicates data to and from the memory 206, and generally controls operations of the controller 104 pursuant to the software 208 and the O/S.

Figure 3:
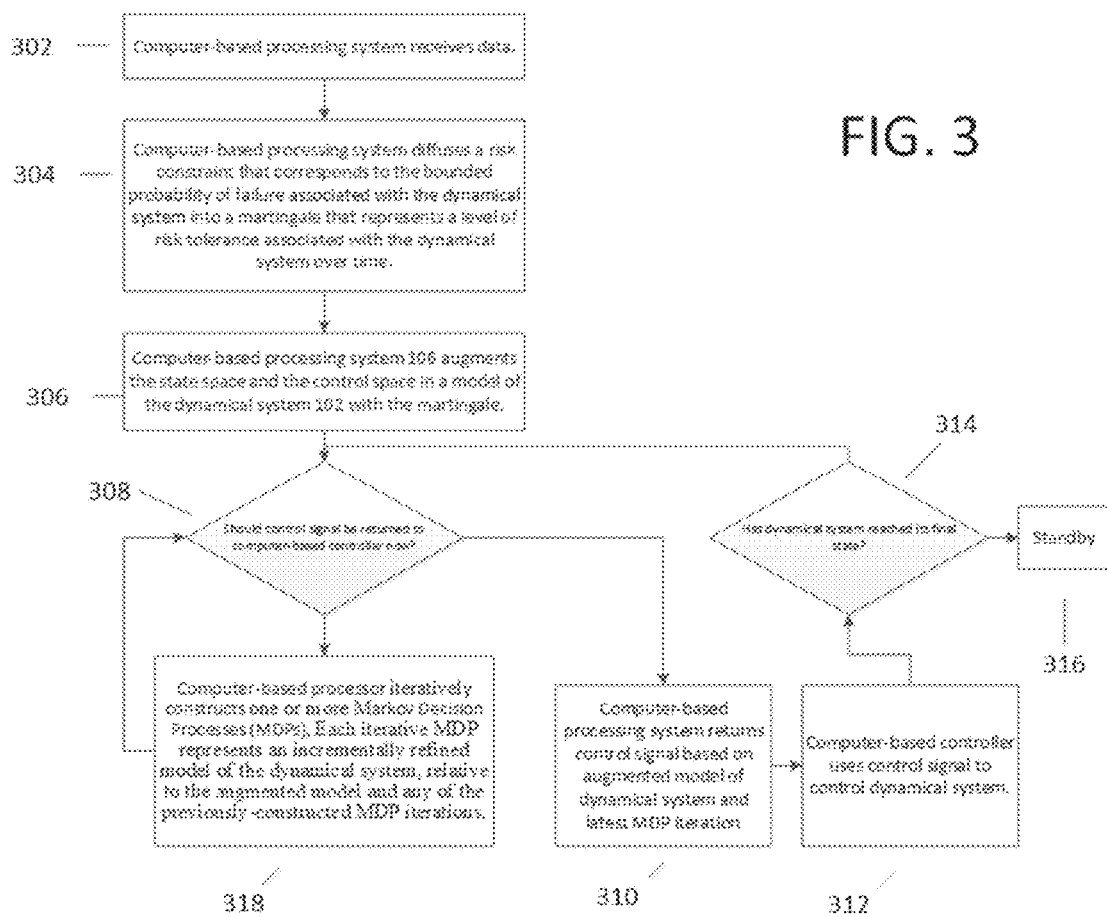
FIG. 3 is a flowchart of an exemplary method that may be performed by the computer-based processing system of FIGS. 1 and 2.
Figure 5C:
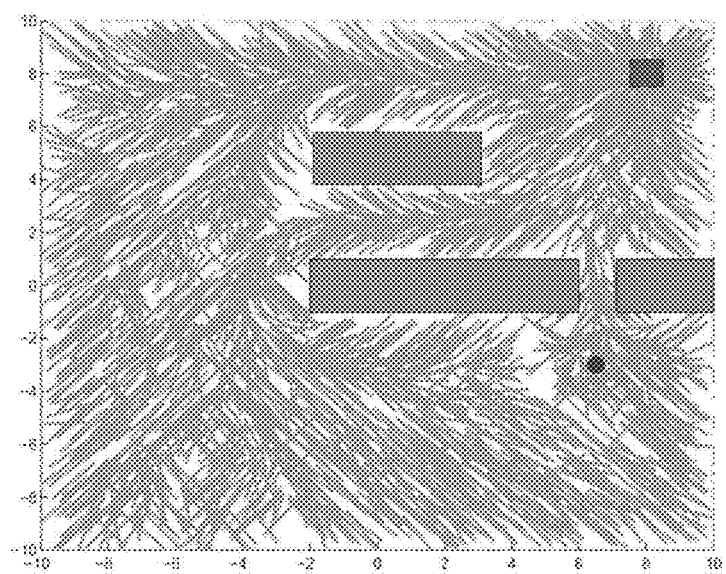
Figure 5D:
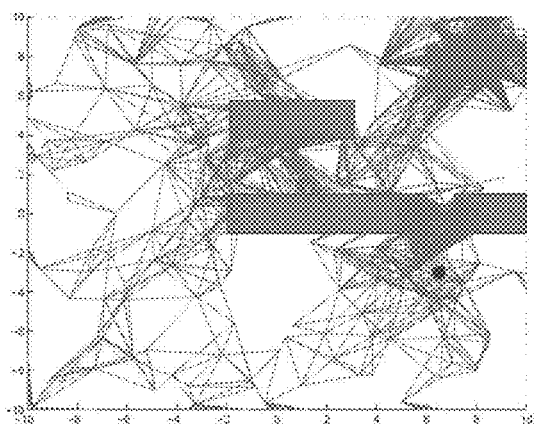
Figure 5E:
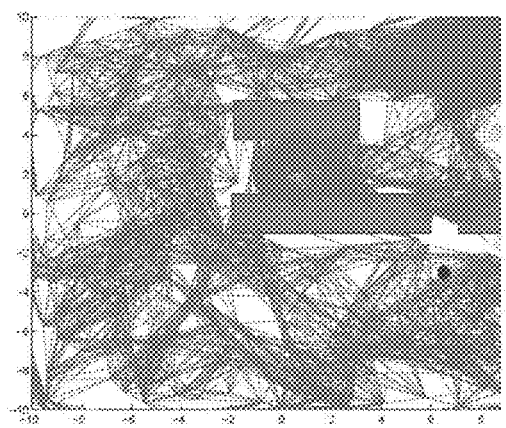
Figure 5F:
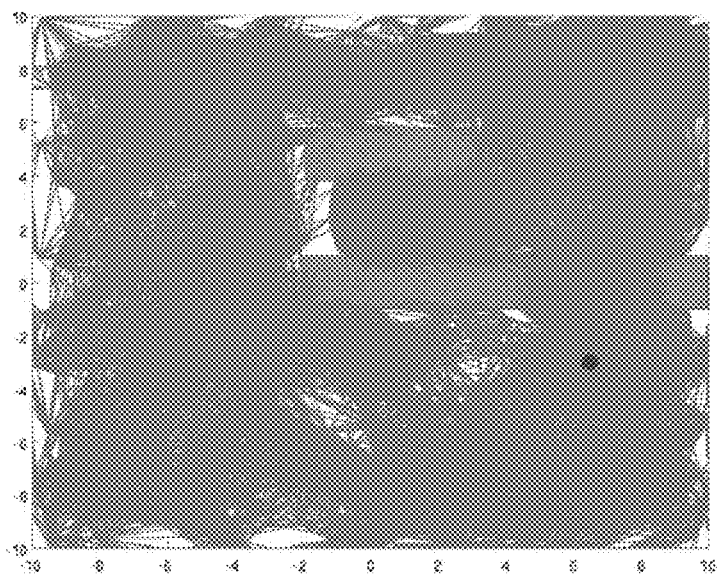
Figure 6A:
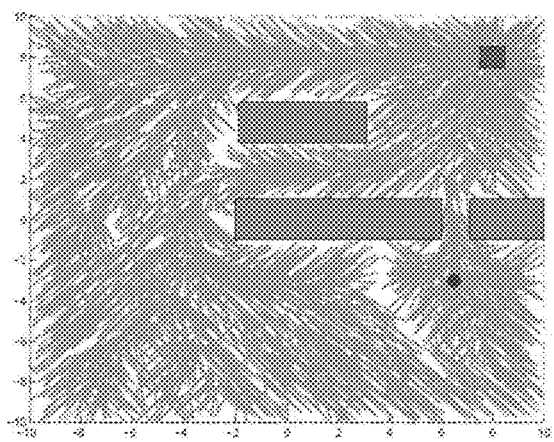
FIGS. 6(a)-6(f) are policy maps, value functions, and failure probabilities of the unconstrained problem and the min-failure probability problem, which form the boundary values of the stochastic target problem.
Figure 6B:
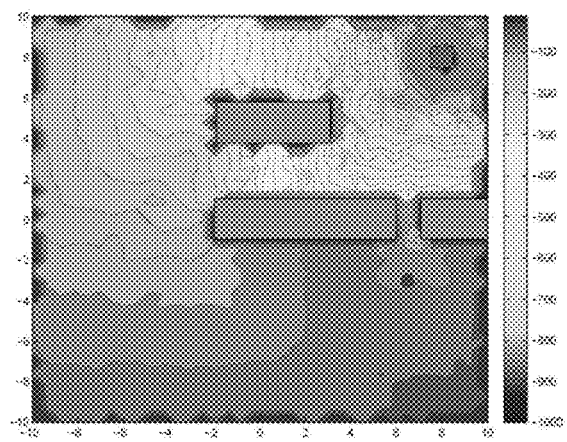
Figure 6C:
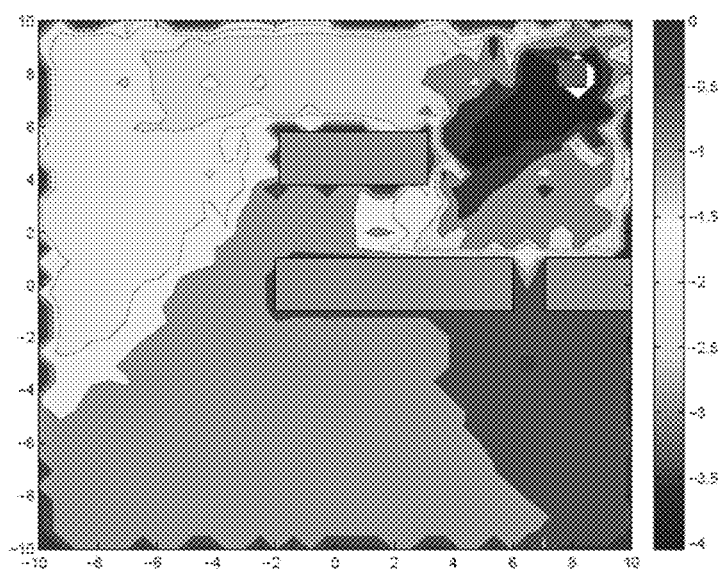
Figure 6D:
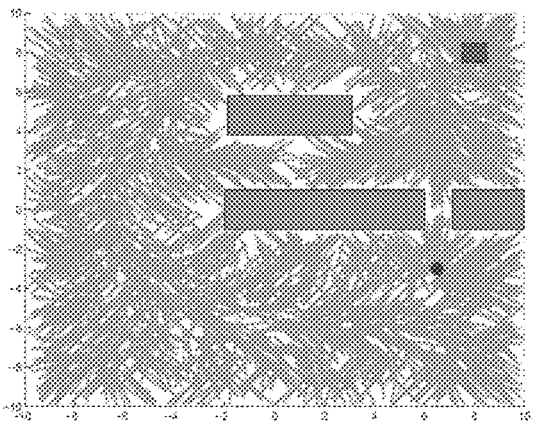
Figure 6E:
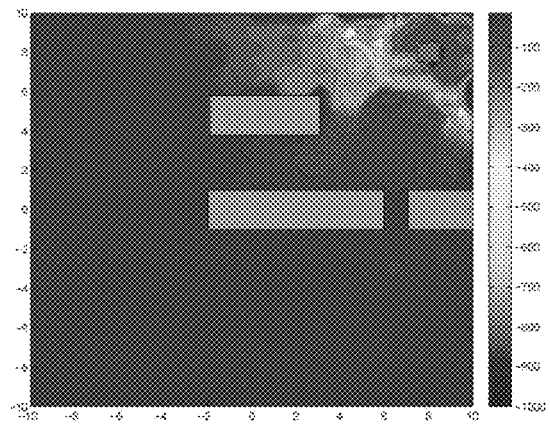
Figure 6F:
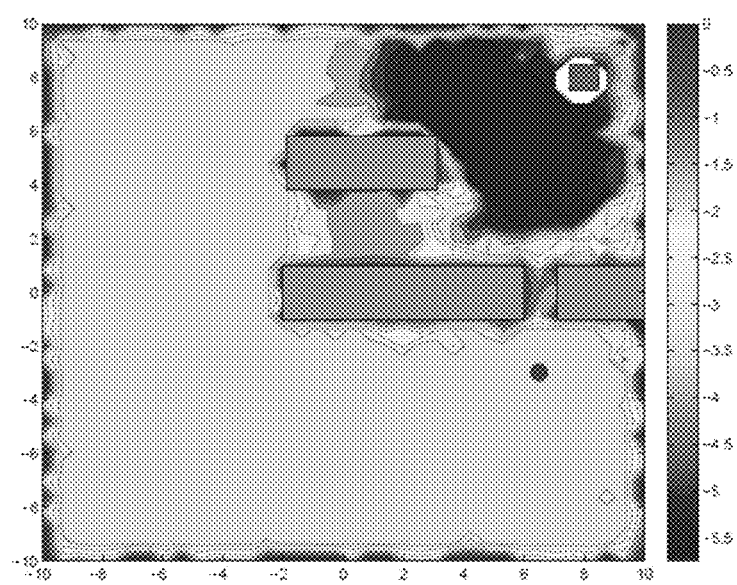

FIG. 3 is a flowchart showing an exemplary method of how the computer-based controller 104 and the computer-based processing system 106 control the dynamical system 102 in an uncertain environment within a bounded probability of failure.

According to the illustrated method, the computer-based processing system 106 receives data (at 302).

The data received can include any type of data that may help the computer-based processing system 106 perform its intended functionalities (e.g., providing control signals to the computer-based controller 104). In a typical implementation, the data that is received at step 302 is used by the computer-based controller 104 and the computer-based processing system 106, as described herein, to understand the dynamical system 102, its environment and the desired performance goals for operating within that environment. As described herein, the computer-based controller 104 and computer-based processing system 106 use this information to efficiently and effectively control the dynamical system 102.

Examples of the kind of data received (at step 302) include data describing the dynamical system itself, data describing the uncertain environment in which the dynamical system is operating, data describing a desired outcome for the dynamical system as specified by a human, data describing noise associated with the dynamical system, data associated with current conditions (e.g., location) of the dynamical system within its operating environment, data describing desired performance metrics (e.g., minimizing energy consumption, achieving shortest time to destination, etc.) for the dynamical system in moving toward the desired outcome, which may have been specified by a human, data regarding a bounded probability of failure for the dynamical system 102, etc.

In a typical implementation, the data regarding the bounded probability of failure that is received at step 302 essentially delimits the maximum acceptable likelihood that the dynamical system will experience some kind of failure.

In a typical implementation, some of the data received at step 302 will have been pre-programmed into the computer-based processing system 106 and stored in memory, for example, by the manufacturer or a system programmer, and some of the data received at step 302 (e.g., the data describing the desired outcome for the dynamical system) will have been entered by a human system operator in real time (i.e., as the dynamical system 102 is operating or is about to operate).

One type of data received (at step 302) is data regarding a bounded probability of failure for the dynamical system 102. According to the illustrated method, the computer-based processing system 106 diffuses (at 304) a risk constraint that corresponds to the bounded probability of failure associated with the dynamical system into a martingale that represents a level of risk tolerance associated with the dynamical system over time. In a typical implementation, the risk constraint would be either equal to or directly related to the data received at step 302 regarding the bounded probability of failure for the dynamical system 102. In general, a martingale is a sequence of random variables $x_1$, $x_2, \ldots$, where the conditional expected value of $x_{n+1}$ given $x_1, x_2, \ldots, x_n$, equals $x_n$.

Next, according to the illustrated method, the computer-based processing system 106 augments (at step 306) the state space and the control space in a model of the dynamical system 102 with the martingale. This creates an augmented model for the dynamical system that has an augmented state space and an augmented control space. In essence, creating the augmented model transforms controlling the dynamical system from a risk-constrained problem into a stochastic target problem.

Then, the computer-based processing system 106 determines (at step 308) whether a control signal should be sent to the computer-based controller 104 immediately or not. There are a variety of ways that the computer-based processing system 106 can make this determination. For example, in some applications, the computer-based processing system 106 includes a timer and determines whether the computer-based controller 104 needs a control signal by referring to a passage of time (e.g., since a previous control signal was sent). In other applications, the computer-based controller 104 indicates to the computer-based processing system 106 when a control signal is needed. Other techniques for determining whether a control signal should be sent to the computer-based controller 104 immediately or not are possible.

If the computer-based processing system 106 determines (at step 308) that a control signal should be sent to the computer-based controller 104 immediately, then the computer-based processing system 106 (at step 310) returns a control signal based on the augmented model of the dynamical system. Returning the control signal (at step 310) at this point, would generally involve computing a solution based on the augmented model of the dynamical system 102. In a typical implementation, computing the solution utilizes a rapidly-exploring sampling technique and approximating Markov chains.

According to the illustrated process, the computer-based controller 104 then uses the control signal (at step 312) to control the dynamical system 102. Controlling the dynamical system 102 can include causing a change of some sort to occur in the dynamical system, typically, a change that will likely move the dynamical system toward a desired final state. If, for example, the dynamical system 102 is a semi-autonomous car and the desired final state is for the semi-autonomous car to be parked in a specific parking space, then controlling the dynamical system 102 may include causing the steering wheel of the semi-autonomous car to move in a specific manner to help the semi-autonomous car to advance into the parking space. As another example, if the dynamical system is a steerable needle and the desired final state is for the needle to be positioned at a particular location inside a human patient, then controlling the dynamical system 102 may include causing the steerable needle to advance through part of the patient toward the particular location.

After controlling the dynamical system (at step 312), in the illustrated process, the computer-based processor 106 considers (at step 314) whether the dynamical system 102 has reached the desired final state (e.g., is the semi-autonomous car parked in the parking space? is the steerable needle at the particular location inside the human patient?).

If the computer-based processor 106 determines (at step 312) that the dynamical system 102 has reached the desired final state, the computer-based processor 106 enters (at step 316) a standby state, essentially awaiting further instructions (e.g., from a human user) or input (e.g., about the dynamical system 102 or the environment that the dynamical system 102 is operating in) that requires some kind of further response.

If the computer-based processor 106 determines (at step 314) that the dynamical system 102 has not reached the desired final state, the computer-based processor returns to step 308 and again determines whether a control signal should be sent to the computer-based controller 104 immediately (i.e., without further delay by the computer-based processor 106) or not. If the computer-based processor determines (at step 308) that a control signal should be sent to the computer-based processor immediately, then the computer-based processor 106 once again returns (at step 312) a control signal to the computer-based controller 104 based on the augmented model of the dynamical system 102.

If the computer-based processor 106 determines (at step 308) that a control signal need not be sent to the computer-based controller 104 immediately, then the computer-based processor 106 proceeds to step 318 and iteratively constructs one or more Markov Decision Processes (MDPs). Each iterative MDP represents an incrementally refined model of the dynamical system, relative to the augmented model and any of the previously-constructed MDP iterations.

Constructing the MDP at each one of the iterations typically includes sampling from an augmented state space associated with the augmented model or a previously-constructed one of the MDP iterations and computing one or more boundary values based on the sampling.

This iterative construction of incrementally refined MDPs continues until the computer-based processing system determines (at step 308) that a control signal should be sent to the computer-based controller 104 without further delay from the computer-based processor 106.

If (or when) the computer-based processing system 106 determines (at step 308) that a control signal should be sent to the computer-based controller 104, the computer-based processor 106 (at step 310) returns a control signal to the computer-based controller 104 based on one of the iterative MDPs (typically, the latest one of the iterative MDPs).

Returning the control signal (at step 310) at this point, would generally involve computing a solution based on one of the iterative MDPs (e.g., the latest one). In a typical implementation, computing the solution utilizes a rapidly-exploring sampling technique and approximating Markov chains.

According to the illustrated process, the computer-based controller 104 then uses the control signal (at step 312) to control the dynamical system 102.

The following sections provide a formal definition of certain problems that the systems and techniques described herein help address and how the systems and techniques described herein address those problems. Like the rest of the detailed description, what follows is intended to be instructive and illustrative only, but not in any way limiting. In a typical implementation, the computer-based processing system 106 would perform processing according to and/or based on what is described herein.

Here, we present an exemplary generic stochastic optimal control formulation with definitions and technical assumptions. We also provide an exemplary explanation as to how to formulate risk constraints.

Stochastic Dynamics: Let $d_x$, $d_u$, and $d_w$ be positive integers. Let S be a compact subset of $\mathbb{R}^{d_x}$, which is the closure of its interior $S^\circ$ and has a smooth boundary $\partial S$. Let a compact subset U of $\mathbb{R}^{d_u}$ be a control set. The state of the system at time t is $x(t) \in S$, which is fully observable at all times.

Suppose that a stochastic process $\{w(t); t \geq 0\}$ is a $d_w$-dimensional Brownian motion on some probability space. We define $\{F_t; t \geq 0\}$ as the augmented filtration generated by the Brownian motion $w(\bullet)$. Let a control process $\{u(t); t \geq 0\}$ be a U-valued, measurable random process also defined on the same probability space such that the pair $(u(\bullet), w(\bullet))$ is admissible. Let the set of all such control processes be U. Let $\mathbb{R}^{d_x \times d_w}$ denote the set of all $d_x$ by $d_w$ real matrices. We consider systems with dynamics described by the controlled diffusion process:

$$dx(t)=f(x(t), u(t))\, dt+F(x(t), u(t))\, dw(t), \forall t \geq 0 \qquad (1)$$

where f: $S \times U \to \mathbb{R}^{d_x}$ and F: $S \times U \to \mathbb{R}^{d_x \times d_w}$ are bounded measurable and continuous functions as long as $x(t) \in S^\circ$. The initial state $x(0)$ is a random vector in S. We assume that the matrix $F(\bullet, \bullet)$ has full rank. The continuity requirement of f and F can be relaxed with mild assumptions such that we still have a weak solution to Eq. 1 that is unique in the weak sense.

Cost-to-go Function and Risk Constraints: We define the first exit time $T_u^z$: $U \times S \to [0, +\infty]$ under a control process $u(\bullet) \in U$ starting from $x(0)=z \in S$ as $$T_u^z = \inf\{t: x(0)=z, x(t) \notin S^\circ, \text{ and Eq. 1}\}.$$

In other words, $T_u^z$ is the first time that the trajectory of the dynamical system given by Eq. 1 starting from $x(0)=z$ hits the boundary $\partial S$ of S. The random variable $T_u^z$ can take value $\infty$ if the trajectory $x(\bullet)$ never exits $S^\circ$.

The expected cost-to-go function under a control process $u(\bullet)$ is a mapping from S to $\mathbb{R}$ defined as:

$$J_u(z)=\mathbb{E}_0^z[\int_0^{T_u^z} \alpha^t g(x(t), u(t))dt+\alpha^{T_u^z} h(x(T_u^z))], \qquad (2)$$

where $\mathbb{E}_t^z$ denotes the conditional expectation given $x(t)=z$, and g: $S \times U \to \mathbb{R}$, h: $S \to \mathbb{R}$ are bounded measurable and continuous functions, called the cost rate function and the terminal cost function, respectively, and $\alpha \in [0, 1)$ is the discount rate. We further assume that $g(x, u)$ is uniformly Holder continuous in x with exponent $2\rho \in (0, 1]$ for all $u \in U$.

Let $\Gamma \subset \partial S$ be a set of failure states, and $\eta \in [0, 1]$ be a threshold for risk tolerance given as a parameter. We consider a risk constraint that is specified for an initial state $x(0)=z$ under a control process $u(\cdot)$ as follows:

$$\text{Prob}_0^z(x(T_u^z) \in \Gamma) \leq \eta),$$

Where $\text{Prob}_t^z$ denotes the conditional probability at time t given $x(t)=z$. That is, controls that drive the system from time 0 until the first exit time must be consistent with the choice of $\eta$ and initial state z at time 0. Intuitively, the constraint enforces that starting from a given state z at time $t=0$, if we execute a control process $u(\cdot)$ for N times, when N is very large, there are at most $N\eta$ executions resulting in failure. Control processes $u(\cdot)$ that satisfy this constraint are called time-consistent. In what follows, we also use $P_0^z$ as the short form of $\text{Prob}_0^z$.

Let $\mathbb{R}$ be the extended real number set. The optimal cost-to-go function $J^*: S \to \mathbb{R}$ is defined as follows:

$$J^*(z; \eta) = \inf_{u(\cdot) \in \mathcal{U}} J_u(z) \tag{3}$$

$$\text{s/t } \text{Prob}_0^z(x(T_u^z) \in \Gamma \leq \eta) \text{ and Eq. (1).} \tag{4}$$

Typically, a control process $u^*(\cdot)$ is called optimal if $J_u^*(z) = J^*(z; \eta)$. Moreover, typically, for any $\in > 0$, a control process $u(\cdot)$ is called an $\in$-optimal policy if $|J_u(z) - J^*(z; \eta)| < \in$.

Typically, we refer to a sampling-based algorithm as being probabilistically sound if the probability that a solution returned by the algorithm is feasible approaches one as the number of samples increases. We also typically refer to a sampling-based algorithm as asymptotically-optimal if the sequence of solutions returned from the algorithm converges to an optimal solution in probability as the number of samples approaches infinity. Solutions returned from algorithms with such properties typically are called probabilistically-sound and asymptotically-optimal.

In general, we consider the problem of computing the optimal cost-to-go function $J^*$ and an optimal control process $u^*$ if obtainable. The approach, outlined herein approximates the optimal cost-to-go function and an algorithm that is both probabilistically-sound and asymptotically-optimal.

We now present a martingale approach that essentially transforms the considered risk-constrained problem into an equivalent stochastic target problem. The following lemma to diffuse risk constraints can be a tool for our transformation. In what follows, both notations $1_{\{x(T_u^z) \in \Gamma\}}$ and $1_\Gamma(x(T_u^z))$ take value 1 if $x(T_u^z) \in \Gamma$ as 0 otherwise.

A. Diffusing Risk Constraints

Lemma 1 From $x(0)=z$, a control process $u(\cdot)$ is generally feasible if and only if there exists a square-integrable (but possibly unbounded) process $c(\cdot) \in \mathbb{R}^{d_w}$ and a martingale $q(\cdot)$ satisfying:
1) $q(0)=\eta$, and $dq(t)=c^T(t)dw(t)$,
2) For all t, $q(t) \in [0, 1]$ a.s.,
3) $1_{x(T_u^z) \in \Gamma} \leq q(T_u^z)$ a.s.

The martingale $q(t)$ stands for the level of risk tolerance at time t. We call $c(\cdot)$ a martingale control process.

Proof: Assuming that there exists $c(\cdot)$ and $q(\cdot)$ as above, due to the martingale property of $q(\cdot)$, we have:

$$\text{Prob}_0^z(x(T_u^z) \in \Gamma) = \mathbb{E}[1_{x(T_u^z) \in \Gamma} | F_0] \leq \mathbb{E}[q(T_u^z) | F_0] = q(0) = \eta.$$

Thus, $u(\cdot)$ is feasible.

Now, let $u(\cdot)$ be a feasible control policy. Set $\eta_0 = \text{Prob}_0^z(x(T_u^z) \in \Gamma)$. We note that $\eta_0 \leq \eta$. We define the martingale:

$$\bar{q}(t) = \mathbb{E}[1_{x(T_u^z) \in \Gamma} | F_t].$$

Since $\bar{q}(T_u^z) \in [0, 1]$, we infer that $\bar{q}(t) \in [0, 1]$ almost surely.

We now set $$\hat{q}(t) = \bar{q}(t) + (\eta - \eta_0),$$

then $\hat{q}(t)$ is a martingale with $\hat{q}(0) = \bar{q}(0) + (\eta - \eta_0) = \eta_0 + (\eta - \eta_0) = \eta$ and $\hat{q}(t) \geq 0$ almost surely.

Now, we define $\tau = \inf\{t \in [0, T_u^z] | \hat{q}(t) \geq 1\}$, which is a stopping time. Thus, $$q(t) = \hat{q}(t) 1_{t < \tau} + 1_{t \geq \tau},$$

as a stopped process of the martingale $\hat{q}(t)$ at $\tau$, is a martingale with values in [0,1] a.s.

If $\tau < T_u^z$, we have $$1_{x(T_u^z) \in \Gamma} \leq 1 = q(T_u^z),$$

and if $\tau = T_u^z$, we have $$q(T_u^z) = \mathbb{E}[1_{x(T_u^z) \in \Gamma} | F_{T_u^z}] + (\eta - \eta_0) \quad = 1_{x(T_u^z) \in \Gamma} + (\eta - \eta_0) \geq 1_{x(T_u^z) \in \Gamma}.$$

Hence, $q(\cdot)$ also satisfies that $1_{x(T_u^z) \in \Gamma} \leq q(T_u^z)$.

The control process $c(\cdot)$ exists due to the martingale representation theorem, which yields $dq(t) = c^T(t) dw(t)$. We however note that $c(t)$ is unbounded.

B. Stochastic Target Problem

Using the above lemma, we augment the original system dynamics with the martingale $q(t)$ into the following form:

$$d\begin{bmatrix} x(t) \\ q(t) \end{bmatrix} = \begin{bmatrix} f(x(t), u(t)) \\ 0 \end{bmatrix} dt + \begin{bmatrix} F(x(t), u(t)) \\ c^T(t) \end{bmatrix} dw(t), \tag{5}$$

where $(u(\cdot), c(\cdot))$ is the control process of the above dynamics. The initial value of the new state is $(x(0), q(0)) = (z, \eta)$. We will refer to the augmented state space $S \times [0, 1]$ as $\bar{S}$ and the augmented control space $U \times \mathbb{R}^{d_w}$ as $\bar{U}$. We also refer to the nominal dynamics and diffusion matrix of Eq. 5 as $\bar{f}(x,q,u,c)$ and $\bar{F}(x,q,u,c)$ respectively.

In the following reformulated problem, optimal control processes are Markov controls. Thus, let us now focus on the set of Markov controls that depend only on the current state, i.e., $(u(t), c(t))$ is a function only of $(x(t), q(t))$, for all $t \geq 0$. A function $\phi: \bar{S} \to \bar{U}$ represents a Markov or feedback control policy, which is known to be admissible with respect to the process noise $w(\cdot)$. Let $\Psi$ be the set of all such policies $\phi$. Let $\mu: \bar{S} \to U$ and $\kappa: \bar{S} \to \mathbb{R}^{d_w}$ so that $\phi = (\mu, \kappa)$. We rename $T_u^z$ to $T_\phi^z$ for the sake of notation clarity. Using these notations, $\mu(\cdot, 1)$ is thus a Markov control policy that maps from S to U. Henceforth, we will use $\mu(\cdot)$ to refer to $\mu(\cdot, 1)$ when it is clear from the context. Let $\pi$ be the set of all such Markov control policies $\mu(\cdot)$ on S. Now, let us rewrite cost-to-go function $J_u(z)$ in Eq. 2 for the threshold $\eta$ at time 0 in a new form:

$$J_\phi(z, \eta) = \mathbb{E}[\int_0^{T_\phi^z} \alpha^t g(x(t), \mu(x(t), q(t))) dt + \alpha^{T_\phi^z} h(x(T_\phi^z)) | x, q)(0) = (z, \eta)]. \tag{6}$$

We therefore essentially transform the risk-constrained problem in Eqs. 3-4 into a stochastic target problem as follows:

$$J^*(z, \eta) = \inf_{\varphi \in \Psi} J_\varphi(z, \eta) \tag{7}$$

$$\text{s/t } 1_{x(T_\phi^z) \in \Gamma} \leq q(T_q^z) \text{ a.s. and Eq. 5.} \tag{8}$$

The constraint in the above formulation specifies the relationship of random variables at the terminal time as target. In this formulation, we solve for feedback control policies $\phi$ for all $(z, \eta) \in \overline{S}$ instead of a particular choice of $\eta$ for $x(0)=z$ at time $t=0$. We note that in this formulation, boundary conditions are not fully specified a priori.

What follows is a discussion on an exemplary way to remove the constraint in Eq. 8 by constructing its boundary and computing the boundary values.

C. Characterization and Boundary Conditions

The domain of the stochastic target problem is:

$$D=\{(z, \eta) \in \overline{S} | \exists_\phi \in \Psi s/t \, 1_{x(T_\phi^z) \in \Gamma} \leq q(T_\phi^z) \, a.s.\}.$$

By the definition of the risk-constrained problem, we can see that if $(z, \eta) \in D$ then $(z, \eta') \in D$ for any $\eta \leq \eta' \leq 1$. Thus, for each $z \in S$, we define $$\gamma(z) = \inf \{\eta \in [0,1] | (z, \eta) \in D\}, \quad (9)$$

as the infimum of risk tolerance at $z$. Therefore, we also have:

$$\gamma(z) = \inf_{u \in \mathcal{U}} \mathrm{Prob}_0^z(x(T_u^z) \in \Gamma) = \inf_{u \in \mathcal{U}} \mathbb{E}_0^z[1_{x(T_u^z) \in \Gamma}]. \quad (10)$$

Thus, the boundary of D is $$\partial D = S \times \{1\} \cup \{(z, \gamma(z)) | z \in S\} \cup \{(z, \eta) | z \in \partial S, \eta \in [\gamma(z), 1]\}. \quad (11)$$

For states in $\{(z, \eta) | z \in \partial S, \eta \in [\gamma(z), 1]\}$, the system stops on $\partial S$ and takes terminal values according to $h(\bullet)$. Now, let $\eta=1$, we notice that $J^*(z,1)$ is optimal cost-to-go from $z$ for the stochastic optimal problem without the risk constraint:

$$J^*(z, 1) = \inf_{u \in \mathcal{u}} J_u(z).$$

An optimal control process that solves the optimization problem is given by a Markov policy $\mu^*(\bullet, 1) \in \Pi$. We now define the failure probability function $\Gamma: S \to [0.1]$ under such an optimal policy $\mu^*(\bullet, 1)$ as follows:

$$\Gamma(z) = \mathbb{E}[1_\Gamma(x(T_{\mu^*,z}))], \forall z \in S,$$

where $T_{\mu^*,z}$ is the first exit time when the system follows the control policy $\mu^*(\bullet, 1)$ from the initial state $z$. By the definitions of $\gamma$ and $\Gamma$, we can recognize that $\Gamma(z) \geq \gamma(z)$ for all $z \in S$.

Since following the policy $\mu^*(\bullet, 1)$ from an initial state $z$ yields a failure probability $\Gamma(z)$, we infer that:

$$J^*(z,1) = > J^*(z, \Gamma(z)).$$

From the definition of the risk-constrained problem, we also have:

$$0 \leq \eta \leq \eta' \leq 1 \leq J^*(z,\eta) \geq J^*(z,\eta').$$

Thus, for any $\Gamma(z) \leq \eta < 1$, we have:

$$J^*(z,1) \leq J^*(z,\eta) \leq J^*(z, \Gamma(z)).$$

Combing equations above, we have:

$$\forall \eta \in [\Gamma(z), 1] => J^*(z, \eta) = J^*(z, 1).$$

As a consequence, when we start from an initial state $z$ with a risk threshold $\eta$ that is at least $\Gamma(z)$, it is optimal to execute an optimal control policy of the corresponding unconstrained problem from the initial state $z$.

It also follows that reducing the risk tolerance from 1.0 along the controlled process cannot reduce the optimal cost-to-go function evaluated at $(x(t), q(t)=1.0)$. Thus, we infer that for augmented states $(x(t), q(t))$ where $q(t)=1.0$, the optimal martingale control $c^*(t)$ is 0.

Now, under all admissible policies $\phi$, we cannot obtain a failure probability for an initial state $z$ that are lower than $\gamma(z)$. Thus, it is clear that $J^*(z, \eta) = +\infty$ for all $0 \leq \eta < \gamma(z)$. The following lemma characterizes the optimal martingale control $c^*(t)$ for augmented states $(x(t), q(t)=\gamma(x(t)))$.

Lemma 2 Given the problem definition as in Eqs. 3-4, when $q(t)=\gamma(x(t))$ and $u(t)$ is chosen, we have:

$$c(t)^T = \frac{\partial \gamma^T}{\partial x(t)} F(x(t), u(t)). \quad (12)$$

Proof: Using the geometric dynamic programming principle we have the following result, for all stopping time $\tau \geq t$, when $q(t)=\gamma(x(t))$, a feasible control policy $\phi \in \Psi$ satisfies $q(\tau) \geq \gamma(x(\tau))$ almost surely.

We assume that $\gamma(x)$ is a smooth function. Take $\tau=t+$, under a feasible control policy $\phi$, we have $q(t+) \geq \gamma(x(t+))$ a.s. for all $t$, and hence $dq(t) \geq d\gamma(x(t))$ a.s. By Itô lemma, we derive the following relationship:

$$c^T(t) dw(t) \geq \frac{\partial \gamma^T}{\partial x}(f(x(t), u(t))dt + F(x(t), u(t))dw(t)) +$$
$$\frac{1}{2} Tr\left( F(x(t), u(t))F(x(t), u(t))^T \frac{\partial^2 \gamma}{(\partial x)^2} \right) dt \, a.s.$$

For the above inequality to hold almost surely, the coefficient of $dw(t)$ should be 0. This leads to Eq. 12.

In addition, if a control process that solves Eq. 10 is obtainable, say $u_\gamma$, then we have $J^*(z, \gamma(z)) = J_{u_\gamma}(z)$. We henceforth denote $J^*(z, \gamma(z))$ as $J^\gamma(z)$. We also emphasize that when $(x(t), q(t))$ is inside the interior $D^\circ$ of D, usual dynamic programming principle holds.

Here, we briefly overview an exemplary Markov chain approximation technique. We then present an exemplary extended iMDP algorithm that incrementally constructs the boundary conditions and computes solutions to our problem. In particular, we sample in the original state space S to compute $J^*(z, 1)$, $\Gamma(z)$, $\gamma(z)$ as in Eq. 10 and $J^\gamma(z)$. Concurrently, we also sample in the augmented state space $\overline{S}$ with appropriate values for samples on the boundary of D.

A. Markov Chain Approximation

An exemplary discrete-state Markov decision process (MDP) is a tuple $M=(X, A, P, G, H)$ where X is a finite set of states, A is a set of actions that is possibly a continuous space, $P(\bullet|\bullet, \mathbf{500}): X \times X \times A \to \mathbb{R} \leq 0$ is the transition probability function, $G(\bullet, \bullet): X \times A \to \mathbb{R}$ is an immediate cost function, and $H: X \to \mathbb{R}$ is a terminal cost function. From an initial state $\xi_0$, under a sequence of controls $\{u_i; i \in \mathbb{N}\}$, the induced trajectory $\{\xi_i; i \in \mathbb{N}\}$ is generated by following the transition probability function P.

On the state space S, we want to approximate $J^*(z,1)$, $\gamma(z)$ and $J\gamma(z)$, and it is suffice to consider optimal Markov controls. The Markov chain approximation method approximates the continuous dynamics in Eq. 1 using a sequence of MDPs $\{M_n=(S_n, U, P_n, G_n, H_n)\}_{n=0}^\infty$ and a sequence of holding times $\{\Delta t_n\}_{n=0}^\infty$ that are locally consistent. In particular, we construct $G_n(z, v)=g(z, v)\Delta t_n(z)$, $H_n(z)=h(z)$ for each $z \in S_n$ and $v \in U$. Also, $\lim_{n \to \infty} \sup_{i \in N, \omega \in \Omega_n} \|\Delta \xi_i^n\|_2 = 0$ where $\Omega_n$ is the sample space of $M_n$, $\Delta \xi_i^n = \xi_{i+1}^n - \xi_i^n$, and For all $z \in S$, $\lim_{n \to \infty} \Delta t_n(z) = 0$, For all $z \in S$ and all $v \in U$:

$$\lim_{n \to \infty} \frac{\mathbb{E}_{P_n}[\Delta \xi_i^n \mid \xi_i^n = z, u_i^n = v]}{\Delta t_n(z)} = f(z, v),$$

$$\lim_{n \to \infty} \frac{\mathrm{Cov}_{P_n}[\Delta \xi_i^n \mid \xi_i^n = z, u_i^n = v]}{\Delta t_n(z)} = F(z, v)F(z, v)^T.$$

One of the main ideas of the Markov chain approximation approach for solving the original continuous problem is to solve a sequence of control problems defined on $\{M_n\}_{n=0}^{\infty}$ as follows. A Markov or feedback policy $\mu_n$ is a function that maps each state $z \in S_n$ to a control $\mu_n(z) \in U$. The set of all such policies is $\pi_n$. We define $t_i^n = \Sigma_0^{t-1} \Delta t_n(\xi_i^n)$ for $i \geq 1$ and $t_{0=0}^n$. Given a policy $\mu_n$ that approximates a Markov control process $u(\cdot)$ in Eq. 2, the corresponding cost-to-go due to $\mu_n$ on $M_n$ is:

$$J_{n,pn}(z) = \mathbb{E}_{P_n}^z \left[ \sum_{i=0}^{I_n - 1} \alpha^{t_i^n} G_n(\xi_i^n, \mu_n(\xi_i^n)) + \alpha^{t_{I_n}^n} H_n(\xi_{I_n}^n) \right],$$

where $\mathbb{E}_{P_n}^z$ denotes the conditional expectation given $\xi_{0=z}^n$ under $P_n$, and $\{\xi_i^n : i \in \mathbb{N}\}$ is the sequence of states of the controlled Markov chain under the policy $\mu_n$, and $I_n$ is termination time defined as $I_n = \min\{i : \xi_i^n \in \partial S_n\}$ where $\partial S_n = \partial S \cap S_n$.

The optimal cost-to-go function $J^*_n : S \to \mathbb{R}$ that approximates $J^*(z,1)$ is denoted as $$J_n^*(z, 1) = \inf_{\mu_n \in \Pi_n} J_{n,\mu_n}(z) \,\forall\, z \in S_n. \quad (13)$$

An optimal policy, denoted by $\mu^*_n$, satisfies $J_{n,\mu^*_n}(z) = J^*_n(z)$ for all $Z \in S_n$. For any $\in > 0$, $\mu_n$ is an $\in$-optimal policy if $\|J_{n,p} - J^*_n\|_{\infty} \leq \in$. We also define the failure probability function $\Gamma_n : S_n \to [0,1]$ due to an optimal policy $\mu^*_n$ as follows:

$$\Gamma_n(z) = \mathbb{E}_{P_n}[1_{\Gamma}(\xi_{I_n}^n) \mid x(0) = z; \mu^*_n] \,\forall_z \in S_n,$$

where we denote $\mu^*_n$ after the semicolon (as a parameter) to emphasize the dependence of the Markov chain on this control policy.

In addition, the min-failure probability on $\gamma_n$ on $M_n$ that approximates $\gamma(z)$ is defined as:

$$\gamma_n(z) = \inf_{\mu_n \in \Pi_n} \mathbb{E}_{P_n}^z \left[ 1_{\xi_{I_n}^n \in \Gamma} \right] \forall\, z \in S_n. \quad (14)$$

We note that the optimization programs in Eq. 13 and Eq. 14 may have two different optimal feedback control policies. Let $v_n \in \Pi_n$ be a control policy on $M_n$ that achieves $\gamma_n$, then the cost-to-go $J_n^{\gamma \, due \, to \, v}$$_n$ approximates $J^{\gamma}(z)$.

Similarly, in the augmented state space $\overline{S}$, we use a sequence of MDPs $\{\overline{M}_n = (\overline{S}_n, \overline{U}, \overline{P}_n, \overline{G}_n, \overline{H}_n)\}_{n=0}^{\infty}$ and a sequence of holding $\{\overline{\Delta t}_n\}_{n=0}^{\infty}$ that are locally consistent with the augmented dynamics in Eq. 5. In particular, $\overline{S}_n$ is a random subset of $D \subset \overline{S}$, $\overline{G}_n$ is identical to $G_n$, and $\overline{H}_n(z, \eta)$ is equal to $H_n(z)$ if $\eta \in [\gamma_n(z), 1]$ and $+\infty$ otherwise. Similar to the construction of $P_n$ and $\Delta t_n$, we also construct the transition probabilities $\overline{P}_n$ on $\overline{M}_n$ and holding time $\overline{\Delta t}_n$ that satisfy the local consistency conditions for nominal dynamics $\bar{f}(x, q, u, c)$ and diffusion matrix $\bar{F}(x, q, u, c)$.

A trajectory on $\overline{M}_n$ is denoted as $\{\bar{\xi}_i^n ; i \in \mathbb{N}\}$ where $\bar{\xi}_i^n \in \overline{S}_n$. A Markov policy $\phi_n$ is a function that maps each state $(z, \eta) \in \overline{S}_n$ to a control $(\mu_n(z, \eta), \kappa_n(z, \eta)) \in \overline{U}$. Moreover, admissible $\kappa_n$ at $(z,1) \in \overline{S}_n$ is 0 and at $(z, \gamma_n(z)) \in \overline{S}_n$ is a function of $\mu(z, \gamma_n(z))$ as shown in Eq. 12. Admissible $\kappa_n$ for other states in $\overline{S}_n$ is such that the martingale-component process of $\{\bar{\xi}_i^n ; i \in \mathbb{N}\}$ belongs to $[0,1]$ almost surely. We can show that equivalently, each control component of $\kappa_n(z, \eta)$ belongs to $$\left[ -\frac{\min(\eta, 1-\eta)}{\overline{\Delta t}_n d_w}, \frac{\min(\eta, 1-\eta)}{\overline{\Delta t}_n d_w} \right].$$

The set of all such policies $\phi_n$ is $\Psi_n$.

Under a control policy $\phi_n$, the cost-to-go on $\overline{M}_n$ that approximates Eq. 6 is defined as:

$$J_{n,\varphi_n}(z, \eta) = \mathbb{E}_{\overline{P}_n}^{z,\eta} \left[ \sum_{t=0}^{I_n - 1} \alpha^{\bar{t}_i} \overline{G}_n(\bar{\xi}_i^n, \mu_n(\bar{\xi}_i^n)) + \alpha^{\bar{t}_{I_n}} \overline{H}_n(\bar{\xi}_{I_n}^n) \right], \quad (16)$$

To solve the above optimization, we compute approximate boundary values for states on the boundary of D using the sequence of MDP $\{M_n\}_{n=0}^{\infty}$ on S as discussed above. For states $(z, \eta) \in \overline{S}_n \cap D^\circ$, the normal dynamic programming principle holds.

The extension of iMDP outlined below is designed to compute the sequence of optimal cost-to-go functions $\{J^*_n\}_{n=0}^{\infty}$, associated failure probability functions $\{\Gamma_n\}_{n=0}^{\infty}$, min-failure probability functions $\{\Gamma_n\}_{n=0}^{\infty}$, min-failure costs functions $\{J_n^{\gamma}\}_{n=0}^{\infty}$, and the sequence of any-time control policies $\{\mu_n\}_{n=0}^{\infty}$ and $\{\kappa_n\}_{n=0}^{\infty}$ in an incremental procedure.

B. Extension of iMDP

Before presenting the details of the algorithm, we discuss a number of primitive procedures.

1) Sampling: The sample (X) procedure sample states independently and uniformly in X.

2) Nearest Neighbors: Given $\zeta \in X \subset \mathbb{R}^{d_x}$ and a set $Y \subseteq X$, for any $k \in \mathbb{N}$, the procedure nearest $(\zeta, Y, k)$ returns the nearest states $\zeta' \in Y$ that are closest to $\zeta$ in terms of the $d_x$-dimensional Euclidean norm.

3) Time Intervals: Given a state $\zeta \in X$ and a number $k \in \mathbb{N}$, the procedure ComputeHoldingTime $(\zeta, k, d)$ returns a holding time computed as follows:

$$ComputeHoldingTime(\zeta, k, d) = \chi_t \left( \frac{\log k}{k} \right)^{\theta < \rho / d}$$

where $Xt > 0$ is a constant, and $\zeta$, $\theta$ are constants in $(0,1)$ and $(0,1]$ respectively. The parameter $\rho \in (0, 0.5]$ defines the Holder continuity of the cost rate function $g(\cdot, \cdot)$.

4) Transition Probabilities: We are given a state $\zeta \in X$, a subset $Y \in X$, a control v in some control set V, a positive number $\tau$ describing a holding time, k is a nominal dynamics, K is a diffusion matrix. The procedure ComputeTranProb$(\zeta, v, T, Y, k, K)$ returns (i) a finite set $Z_{near} \subset X$ of states such that the state $\zeta + k(\zeta, v)\tau$ belongs to the convex hull of $Z_{near}$ and $\|z' - z\|_2 = O(\tau)$ for all $\zeta' \neq \zeta \in Z_{near}$, and (ii) a function P that maps $Z_{near}$ to a non-negative real numbers such that $P(\in)$ is a probability distribution over the support $Z_{near}$. It is crucial to ensure that these transition probabilities result in a sequence of locally consistent chains that approximate k and K.

5) Backward Extension: Given T>0 and two states z, z'∈S, the procedure ExtBackwardsS(z,z',T) returns a triple (x, v, τ) such that (i) x(t)=f(x(t), u(t))dt and u(t)=v∈U for all t∈[0, τ], (ii) τ≤T, (iii) x(t)∈S for all t∈[0, τ], (iv) x(τ)=z, and (v) x(0) is close to z'. If no such trajectory exists, the procedure returns failure. We can solve for the triple (x, v, τ) by sampling several controls v and choose the control resulting in x(0) that is closest to z'. When (z, η), (z', η') are in $\overline{S}$, the procedure ExtBackwardsSM( (z, η), (z',η'),T) returns (x, q, v, τ) in which (x, v, τ) is output of ExtBackwardsS (z, z', T) and q is sampled according to a Gaussian distribution $N(\eta',\sigma_q)$ where $\sigma_q$ is a parameter.

6) Sampling and Discovering Controls: For z∈S and Y ⊆S, the procedure ConstructControlsS(k, z, Y, T) returns a set of k controls in U. We can uniformly sample k controls in U. Alternatively, for each state z'∈Nearest (z, Y, k), we solve for a control v∈U such that (i) x(t)=f(x(t), u(t))dt and u(t)=v∈U for all t∈[0, T], (ii) x(t)∈S for all t∈[0, T), (iii) x(0)=z and x(T)=z'.

For $(z, \eta) \in \overline{S}$ and $Y \subseteq \overline{S}$, the procedure ConstructControlsSM (k, (z, η), Y, T) returns a set of k controls in $\overline{U}$ such that the U-component of these controls are computed as in ConstructControlsS, and the martingale-control-components of these controls are sampled in admissible sets.

The extended iMDP algorithm is presented in Algorithms 1-6 (FIG. 4). The algorithm incrementally refines two MDP sequences, namely $\{M_n\}_{n=0}^{\infty}$ $\{\overline{M}_n\}_{n=0}^{\infty}$, and two holding time sequences, namely $\{\Delta t_n\}_{n=0}^{\infty}$ and $\{\overline{\Delta t}_n\}_{n=0}^{\infty}$, that consistently approximate the original system in Eq. 1 and the augmented system in Eq. 5 respectively.

We associate with $z \in S_n$ a cost value $J_n(z, 1)$, a control $\mu_n(\cdot, 1)$, a failure probability $\Gamma_n(z)$ due to $\mu_n(\cdot, 1)$, min-failure probability $\gamma_n(z)$, a cost-to-go value $J_n^{\gamma}(z)$ induced by the obtained min-failure policy. Similarly, we associate with $\overline{z} \in \overline{S}_n$ a cost value $J_n(\overline{z})$, a control $(\mu_n(\overline{z}), \kappa_n(\overline{z}))$.

As shown in Algorithm 1 (FIG. 4A), initially, empty MDP models $M_0$ and $\overline{M}_0$ are created. The algorithm then executes N iterations in which it samples states on the pre-specified part of the boundary ∂D, constructs the un-specified part of ∂D and processes the interior of D. More specifically, at Line 3, UpdateData Storage (n-1, n) indicates that refined models in the $n^{th}$ iteration are constructed from models in the $(n-1)^{th}$ iteration, which can be implemented by simply sharing memory among iterations. Using rejection sampling, the procedure SampleOnBoundary at Line 4 sample states in ∂S and ∂Sx [0,1] to add to $S_n$ and $\overline{S}_n$ respectively. We also initialize appropriate cost values for these sampled states.

We conduct $K_{1,n}$ rounds to refine the MDP sequence $\{M_n\}_{n=0}^{\infty}$ using the procedure ConstructBoundary (Line 6). Thus, we can compute the cost function $J_n$ and the associated failure probability function $\Gamma_n$ on $S_n \times \{1\}$. In the same procedure, we compute the min-failure probability function $\Gamma_n$ as well as the min-failure cost function $J_n^{\Gamma}$ on $S_n$. In other words, the algorithm effectively constructs approximate boundaries for D and approximate cost-to-go functions $J_n$ on these boundaries over iterations. To compute cost values for the interior $D°$ and D, we conduct $K_{2,n}$ rounds of the procedure ProcessInterior (Line 8) that similarly refines the MDP sequence $\{\overline{M}_n\}_{n=0}^{\infty}$ in the augmented state space. We can choose the values of $K_{1,n}$ and $K_{2,n}$ so that we perform a large number of iterations to obtain stable boundary values before processing the interior domain when n is small. In the following discussion, we will present in detail the implementations of one example of these procedures.

In Algorithm 2 (FIG. 4B), we discuss the implementation of the procedure ConstructBoundary. We construct a finer MDP model $M_n$ based on the previous model as follows. A state $z_s$ is sampled from the interior of the state space S (Line 1). The nearest state $z_{near}$ to $z_s$ (Line 2) in the previous model is used to construct an extended state $z_e$ by using the procedure ExtendBackwardsS at Line 3. The extended states $z_e$ and $(z_e, 1)$ are added into $S_n$ and $\overline{S}_n$ respectively. The associated cost value $J_n(z_e, 1)$, min-failure probability $\gamma_n(z_e)$, min-failure cost value $J_n^{\gamma}(z_e)$ and control $\mu_n(z_e)$ are initialized at Line 7.

We then perform $L_n \geq 1$ updating rounds in each iteration (Lines 8-11). In particular, we construct the update-set $Z_{Update}$ consisting of $K_n = \downarrow(|S_n|^\theta)$ states and $z_e$ where $|K_n| < |S_n|$. For each of state z in $Z_{update}$, the procedure UpdateS as shown in Algorithm 4 (FIG. 4D) implements the following Bellman update:

$$J_n(z, 1) = \min_{v \in U_n(z)} \{G_n(z, v) + \alpha^{\Delta t_n(z)} \mathbb{E}_{P_n}[J_{n-1}(y) | z, v]\}.$$

The details of the implementation are as follows. A set of $U_n$ controls is constructed using the procedure ConstructControlsS where $|U_n| = \downarrow \log(|S_n|)$) at Line 2. For each $v \in U_n$, we construct the support $Z_{near}$ and compute the transition probability $P_n(\cdot | z, v)$ consistently over $Z_{near}$ from the procedure ComputeTranProb (Line 4). The cost values for the state z and controls in $U_n$ are computed at Lines 5. We finally choose the best control in $U_n$ that yields the smallest updated cost value (Line 7). Correspondingly, we improve the min-failure probability $y_n$ and its induced min-failure cost value $J_n^\gamma$ in Lines 8-11

Similarly, in Algorithm 3 (FIG. 4C), we carry out the sampling and extending process in the augmented state space $\overline{S}$ to refine the MDP sequence $\overline{M}_n$(Lines 1-3). In this procedure, if an extended node has a martingale state that is below the corresponding min-failure probability, we initialize the cost value for extended node with a very large constant C representing +∞ (see Lines 5-6). Otherwise, we initialize the extended node as seen in Lines 8-9. We then execute $\overline{L}_n$ rounds (Lines 10-13) to update the cost-to-go $J_n$ for states in the interior $D°$ of D using the procedure UpdateSM as shown in Algorithm 5:

$$J_n(\overline{z}) = \min_{(v,c) \in \overline{U}_n(z)} \{\overline{G}_n(z, v) + \alpha^{\overline{\Delta t}_n(z)} \mathbb{E}_{\overline{P}_n}[J_{n-1}(\overline{y}) | \overline{z}, (v, c)]\}.$$

where the control set $\overline{U}_n$ is constructed by the procedure ConstructControlsSM, and the transition probability $\overline{P}_n(\cdot | \overline{z}, (v,c))$ consistently approximates the augmented dynamics in Eq. 5. To implement the above Bellman update at Line 5 in Algorithm 5, we make use of the characteristics presented in Section 5.2.3 where the notation $I_A$ is 1 if the event A occurs and 0 otherwise. That is, when the martingale state s of a state $\overline{y}=(y, s)$ in the support $\overline{Z}_{near}$ is at least $\Gamma_n(y)$, we substitute $J_n(\overline{y})$ with $J_n(y, 1)$. Similarly, when the martingale state s is equal to γn(y), we substitute $J_n(\overline{y})$ and $J_n^\gamma(y)$.

C. Feedback Control

At the $n^{th}$ iteration, given a state $x \in S$ and a martingale component q, to find a policy control (v, c), we perform a Bellman update based on the approximated cost-to-go $J_n$ for the augmented state (x, q). During the holding time $\Delta t_n$, the original system takes the control v and evolves in the original state space S while we simulate the dynamics of the martingale component under the martingale control c. After this holding time period, the augmented system has a new state (x', q'), and we repeat the above process.

Using the characteristics presented in Section C, we infer that when a certain condition meets, the system can start following a deterministic control policy. More precisely, we recall that for all $\eta \in [\Gamma(z), 1]$, we have $J^*(z, \eta) = J^*(z, 1)$. Thus, starting from any augmented state $(z, \eta)$ where $\eta > \Gamma(z)$, we can solve the problem as if the failure probability were 1.0 and use optimal control policies of the unconstrained problem from the state z.

Algorithm 6 (FIG. 4F), implements the above feedback policy. As shown in this algorithm, Line 3 returns a deterministic policy of the unconstrained problem if the martingale state is large enough, and Lines 5-13 perform a Bellman update to find the best augmented control if otherwise. When the system starts using deterministic policies of the unconstrained problem, we can set the martingale state to 1.0 and set the optimal martingale control to 0 in the following control period.

D. Complexity

The time complexity per iteration of the implementation in Algorithms 1-6 is $O(|\overline{S}_n|^\theta (\log|\overline{S}_n|)^2)$. The space complexity of the iMDP algorithm is $O(|\overline{S}_n|)$ where $|\overline{S}_n| = \downarrow(n)$ due to our sampling strategy.

Now, we present main results on the performance of the extended iMDP algorithm with brief explanation.

We first review the following key results of the approximating Markov chain method when no additional risk constraints are considered. Local consistency implies the convergence of continuous-time interpolations of the trajectories of the controlled Markov chain to the trajectories of the stochastic dynamical system described by Eq. 1. That is, we are able to compute $J^*(\cdot, 1)$ in an incremental manner without directly computing $J^*(\cdot, 1)$. As a consequence, it follows that $\Gamma_n$ converges to $\Gamma$ uniformly in probability. Using the same proof, we conclude that $\gamma n(\cdot)$ and $J_n^\gamma(\cdot)$ converges uniformly to $\gamma(\cdot)$ and $J^*(\cdot, \gamma)$ in probability respectively. Therefore, we have incrementally constructed the boundary values on $\partial D$ of the equivalent stochastic target problem presented in Eqs. (5-8)-(5-9). These results are established based on the approximation of the dynamics in Eq. (3.1) using the MDP sequence $\{M_n\}_{n=0}^\infty$.

Similarly, the uniform convergence of $J_n(\cdot, \cdot)$ to $J^*(\cdot, \cdot)$ in probability on the interior of D is followed from the approximation of the dynamics in Eq. (5.6) using the MDP sequence $\{\overline{M}_n\}_{n=0}^\infty$. In the following theorem, we formally summarize the key convergence results of the extended iMDP algorithm.

Theorem 3 Let $M_n$ and $\overline{M}_n$ be two MDPs with discrete states constructed in S and $\overline{S}$ respectively, and let $J_n : \overline{S}_n \to \mathbb{R}$ be the cost-to-go function returned by the extended iMDP algorithm at the $n^{th}$ iteration. Let us define $\|b\|_x = \sup_{z \in X} b(z)$ as the sup-norm over a set X of a function b with a domain containing X. We have the following events happens in probability:

1) $\text{plim}_{n \to \infty} \|J_n(\cdot, 1) - J^*(\cdot, 1)\|_{s_n} = 0$,
2) $\text{plim}_{n \to \infty} \|\Gamma_n - \Gamma\|_{s_n} = 0$,
3) $\text{plim}_{n \to \infty} \|\gamma_n - \gamma\|_{s_n} = 0$,
4) $\text{plim}_{n \to \infty} \|J_n^\gamma - J^\gamma\|_{s_n} = 0$,
5) $\text{plim}_{n \to \infty} \|J_n - J^*\|_{\overline{s}_n} = 0$.

The first four events construct the boundary conditions on $\partial D$ in probability, which leads to the probabilistically sound property of the extended iMDP algorithm. The last event asserts the asymptotically optimal property through the convergence of the approximating cost-to-go $J_n$ to the optimal cost-to-go $J^*$ on the augmented state space $\overline{S}$.

EXPERIMENTS

In the following experiments, we used a computer with a 2.0-GHz Intel Core 2 Duo T6400 processor and 4 GB of RAM. We controlled a system with stochastic single integrator dynamics to a goal region with free ending time in a cluttered environment. The standard deviation of noise in each direction is 0.5. The system stops when it collides with obstacles or reach the goal region. The cost function is the weighted sum of total energy spent to reach the goal G, which is measured as the integral of square of control magnitude, and terminal cost, which is −1000 for the goal region G and 10 for the obstacle region $\Gamma$, with discount factor $\alpha = 0.9$. The maximum velocity of the system is one. At the beginning, the system starts from (6.5, −3). The system can go through narrow corridors or go around the obstacles to reach the goal region. In this setting, failure is defined as collisions with obstacles, and thus we use failure probability and collision probability interchangeably.

We first show how the extended iMDP algorithm constructs the sequence of approximating MDP's on S over iterations in FIG. 5. In particular, FIGS. 5(a)-5(c) depict anytime policies on the boundary S×1.0 after 500, 1000, and 3000 iterations. FIGS. 5(d)-5(f) show the Markov chains created by anytime policies found by the algorithm on $M_n$ after 200, 500 and 1000 iterations. We observe that the structures of these Markov chains are indeed random graphs that are (asymptotically almost surely) connected to cover the state space S. As in the original version of iMDP, it is worth noting that the structures of these Markov chains can be constructed on-demand during the execution of the algorithm.

The sequence of approximating MDPs on S provides boundary values for the stochastic target problem as shown in FIG. 6. In particular, FIGS. 6(a)-6(c) shows a policy map, cost value function $J_{4000,1.0}$ and the associated collision probability function $\Gamma_{4000}$ for the unconstrained problem after 4000 iterations. Similarly, FIGS. 6(d)-6(f) show a policy map, the associated value function $J_{4000}^\gamma$, and the min-collision probability function $\gamma_{4000}$ iterations. As we can see, for the unconstrained problem, the policy map encourages the system to go through the narrow corridors with low cost-to-go values and high probabilities of collision. In contrast, the policy map from the min-collision probability problem encourages the system to detour around the obstacles with high cost-to-go values and low probabilities of collision.

Figures 7A, 7B:
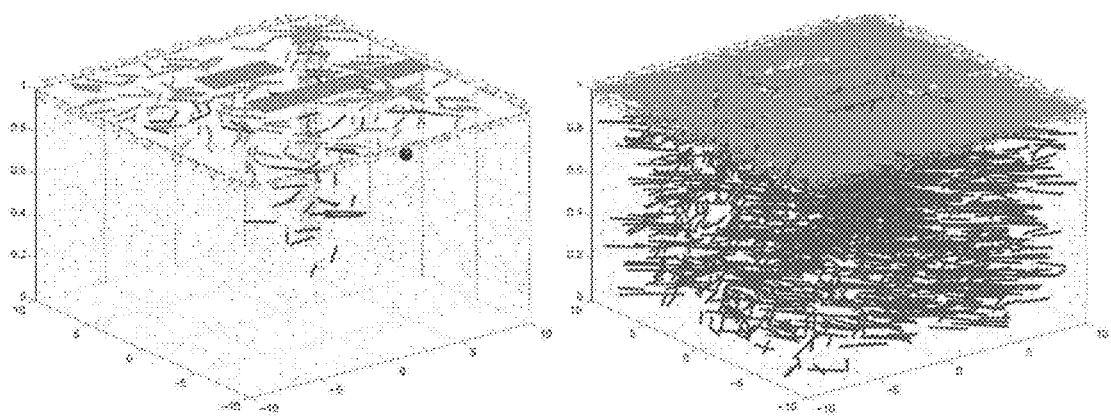
Figure 7C:
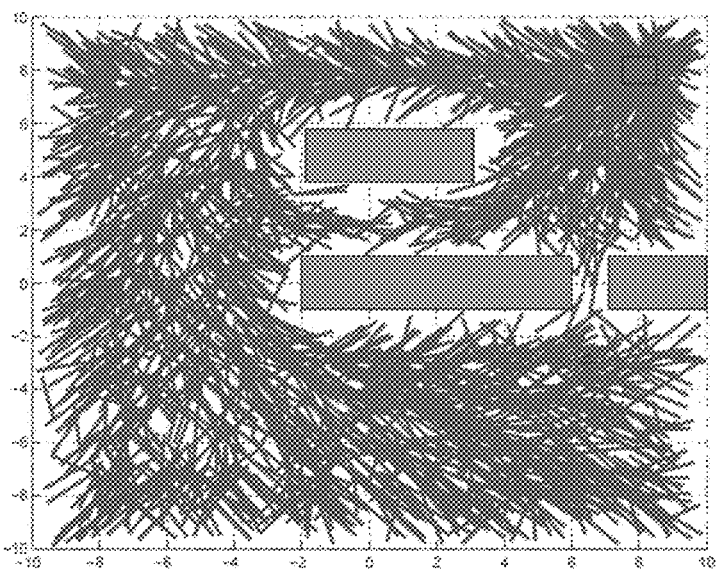
Figure 7F:
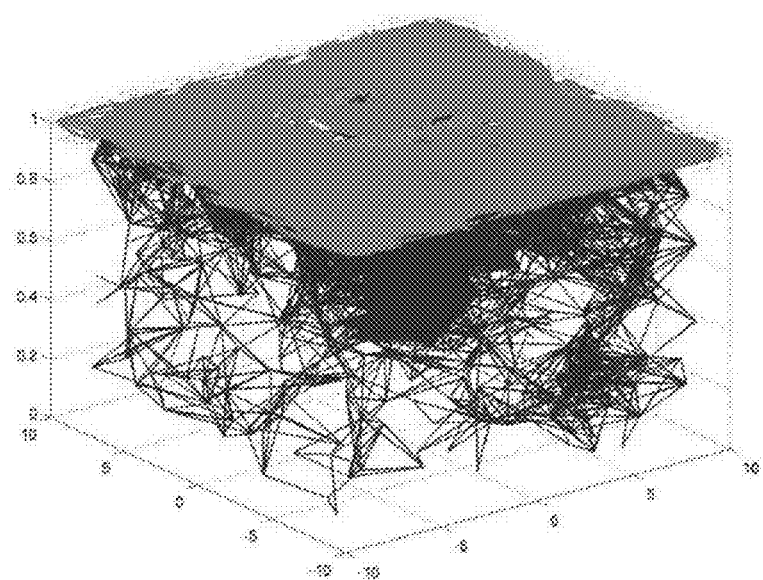
Figure 8A:
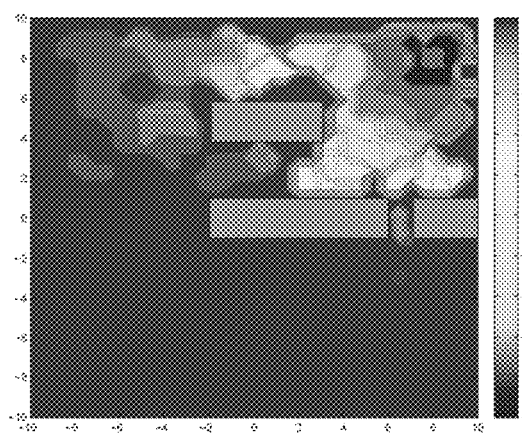
Figure 8B:
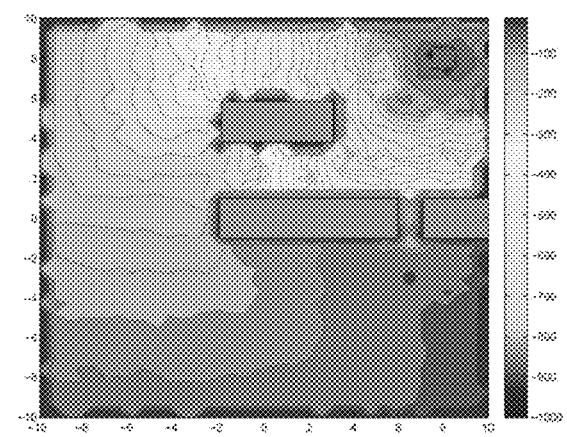
Figure 8C:
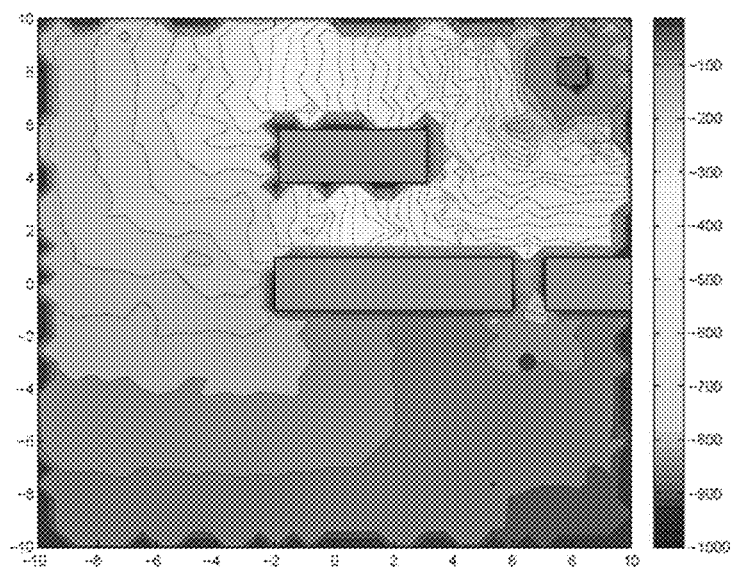
Figure 8F:
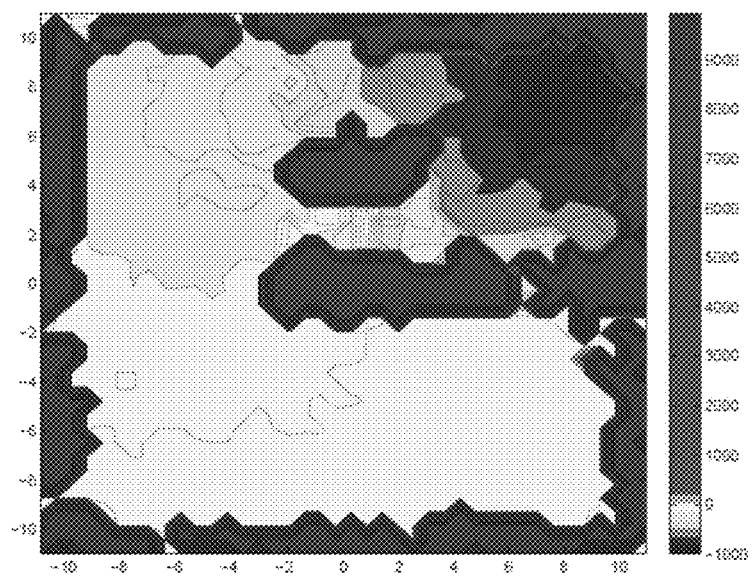

We now show how the extended iMDP algorithm constructs the sequence of approximating MDPs on the augmented state space $\overline{S}$. FIGS. 7(a)-7(b) show the corresponding anytime policies in $\overline{S}$ over iterations. In FIG. 7(c), we show the top down view of a policy for states in $\overline{M}_{3000} \setminus M_{3000}$. Compared to FIG. 6(c), we observe that the system will try to avoid the narrow corridors when the risk tolerance is low. In FIGS. 7(d)-7(f), we show the Markov chains that are created by anytime policies in the augmented state space. As we can see again, the structures of these Markov chains quickly cover $\overline{S}$ with (asymptotically almost-surely) connected random graphs.

We then examine how the algorithm computes the value functions for the interior $D^\circ$ of the reformulated stochastic target problem in comparison with the value function of the unconstrained problem in FIG. 8. FIG. 8(a)-8(c) show approximate cost-to-go $J_n$ when the probability threshold $\eta 0$ is 1.0 for n=200, 2000 and 4000. We recall that the value functions in these figures form the boundary values on Sx1, which is a subset of $\partial D$. In the interior $D^\circ$, FIGS. 8(d)-8(f) present the approximate cost-to-go $J_{4000}$ for augmented states where their martingale components are 0.1, 0.5 and 0.9. As we can see, the lower the martingale state is, the higher the cost value is.

Figure 9A:
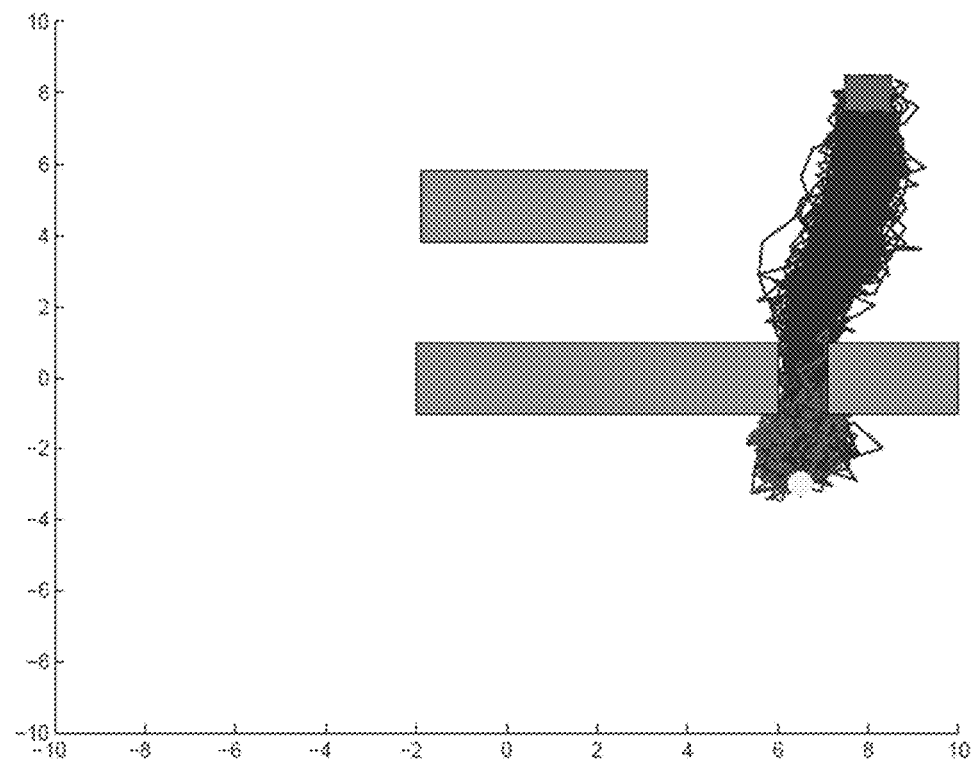
FIGS. 9(a)-9(b) represent unconstrained problem trajectories and min-collision trajectories.
Figure 9B:
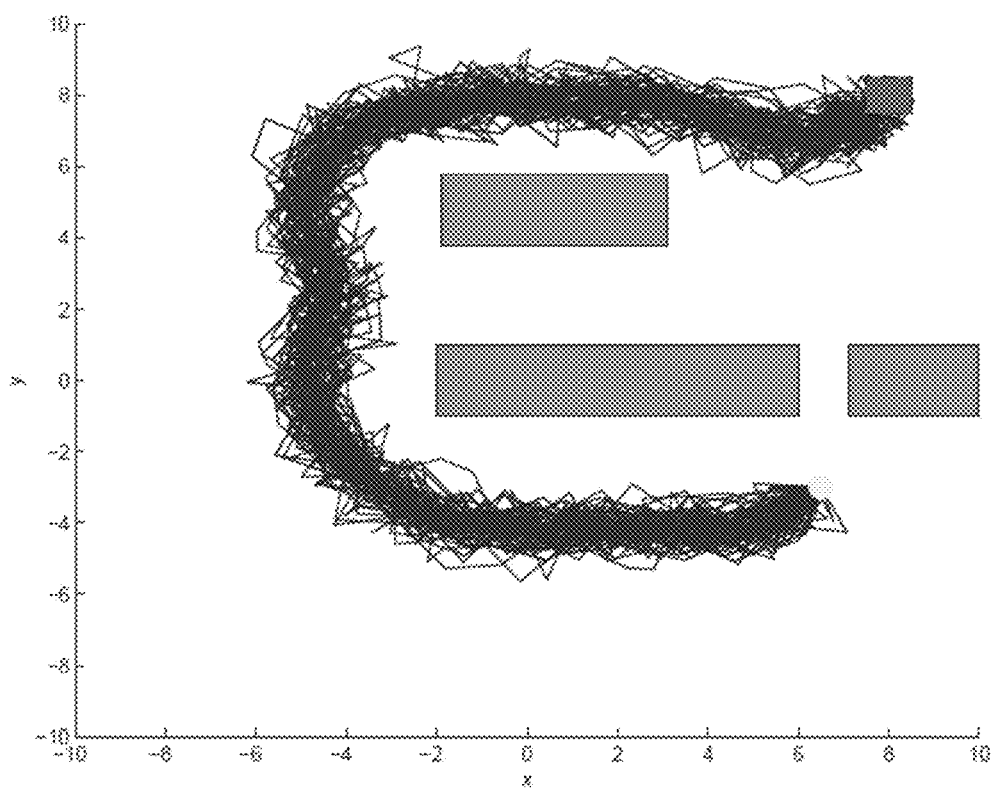

Lastly, we tested the performance of obtained anytime policies after 4000 iterations with different initial collision probability thresholds η. To do this, we first show how the policies of the unconstrained problem and the min-collision probability problem perform in FIG. 9. As we can see, in the unconstrained problem, the system takes risk to go through one of the narrow corridors to reach the goal. In contrast, in the min-collision probability problem, the system detour around the obstacles to reach the goal. While there are about 49.27% of 2000 trajectories that collide with the obstacles for the former, we observe no collision out of 2000 trajectories for the latter. From the characteristics presented herein and illustrated in the FIG. 9, from the starting state (6.5,−3), for any initial collision probability threshold η that is at least 0.4927, we can execute the deterministic policy of the unconstrained problem.

Figure 10:
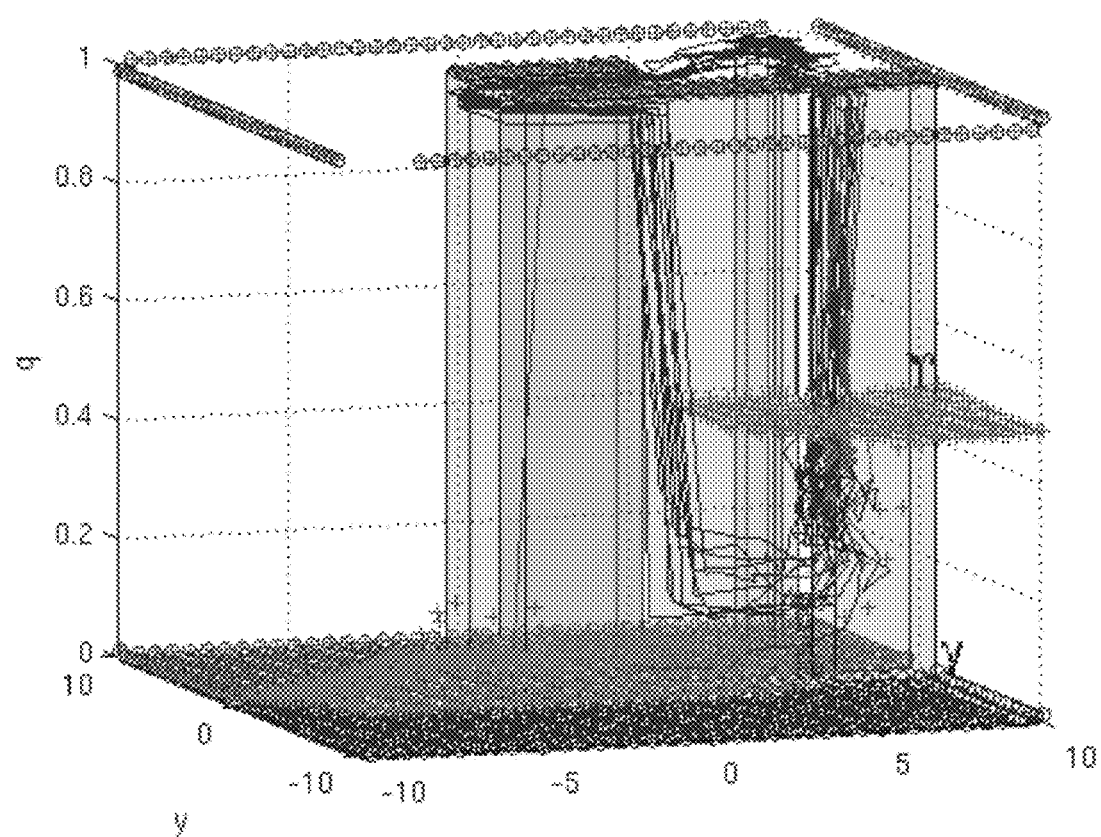
FIG. 10 shows controlled trajectories in an augmented state space.

In FIG. 10, we provide an example of controlled trajectories when the system starts from (6.5,−3) with the failure probability threshold η=0.4. In this figure, the min-collision probability function $\Gamma_{4000}$ is plotted in, and the collision probability function $\Gamma_{4000}$ is plotted. Starting from the augmented state (6.5,−3,0.40), the martingale state varies along controlled trajectories as a random parameter in a randomized control policy obtained from the unconstrained problem.

Figure 11:
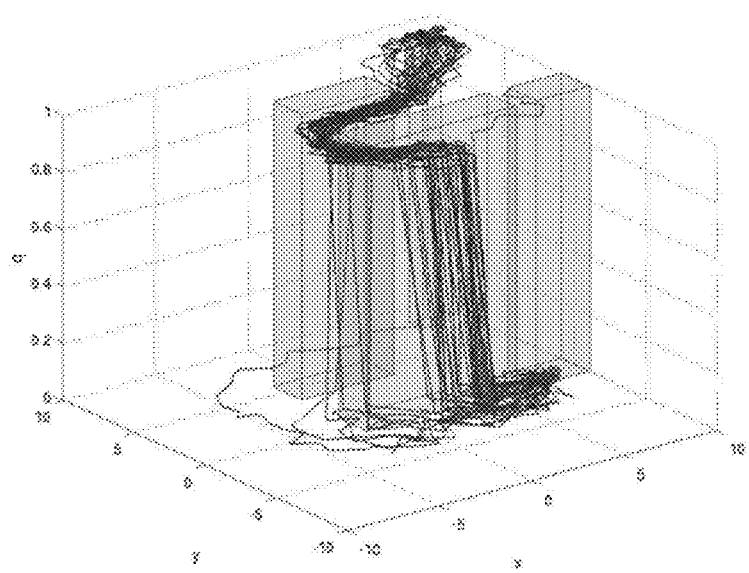
FIGS. 11(a)-11(l) show controlled trajectories in a state space and an augmented state space for different values of risk tolerance.
Figure 11:
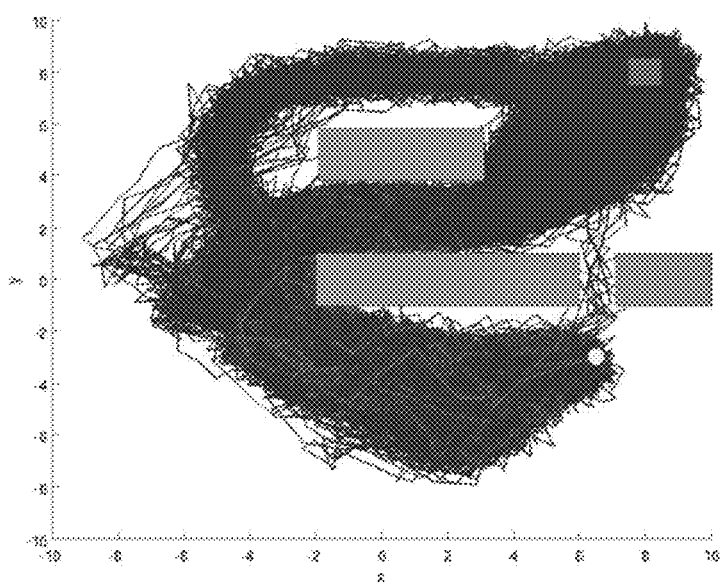
Figure 11:
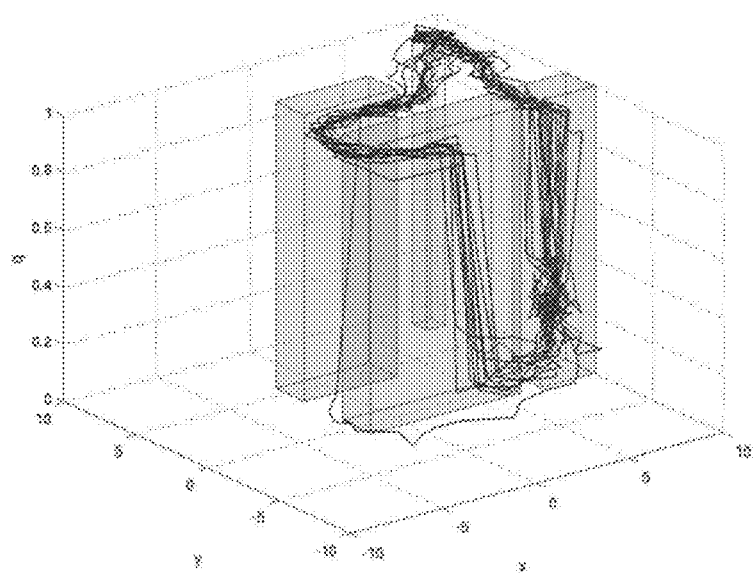
Figure 11:
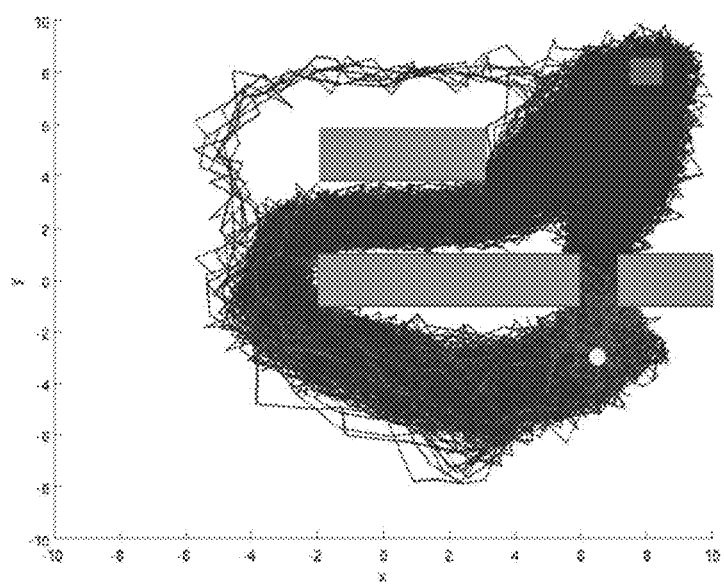

Similarly, in FIG. 11, we show controlled trajectories for different values of η(0.01, 0.05, 0.10, 0.20, 0.30, 0.40). In FIGS. 11(a)-11(c) and FIGS. 11(g)-11(i), we show 50 trajectories resulting from a policy induced by $J_{4000}$ with different initial collision probability thresholds. In FIGS. 11(d)-11(f) and FIGS.

11(j)-11(l), we show 5000 corresponding trajectories in the original state space S with reported simulated collision probabilities and average costs in their captions. These simulated collision probabilities and average costs are show in the following table.

| η | Failure Ratio | Average Cost |
|---|---|---|
| 1.00 | 0.4927 | −125.20 |
| 0.40 | 0.4014 | −115.49 |
| 0.30 | 0.2819 | −76.80 |
| 0.20 | 0.1560 | −65.81 |
| 0.10 | 0.1024 | −58.00 |
| 0.05 | 0.0420 | −42.53 |
| 0.01 | 0.0084 | −19.42 |
| 0.001 | 0.0000 | −18.86 |

As we can see, the lower the threshold is, the higher the average cost is as we expect. When η=0.01 the average cost is −19.42 and when η=1.0, the average cost is −125.20.

Figure 12:
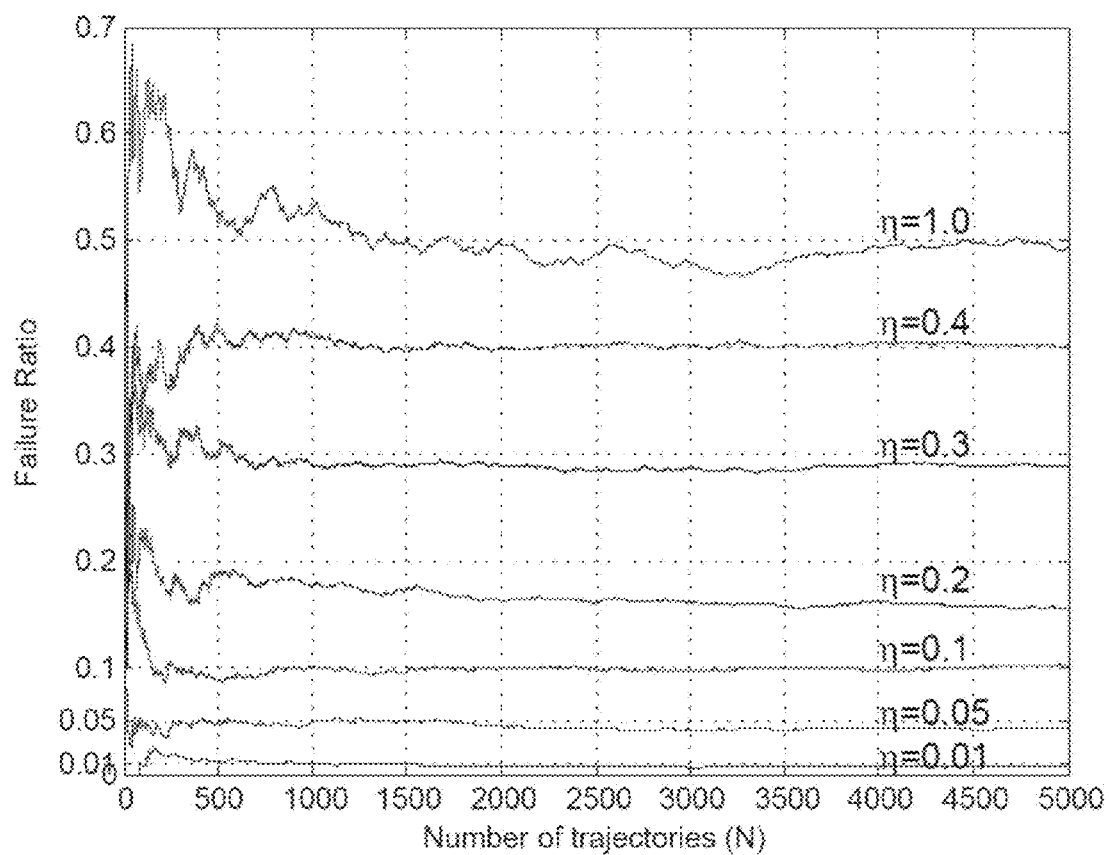
FIG. 12 is a plot of failure ratio vs. number of trajectories.

More importantly, the simulated collision probabilities follow very closely the values of η chosen at time 0. In FIG. 12, we plot these simulated probabilities for the first N trajectories where N∈[1,5000] to show that the algorithm fully respects the bounded failure probability. Thus, this observation indicates that the extended iMDP algorithm is able to manage the risk tolerance along trajectories in different executions to minimize the expected costs using feasible and time-consistent anytime policies.

Prophetic Example

Figure 13:
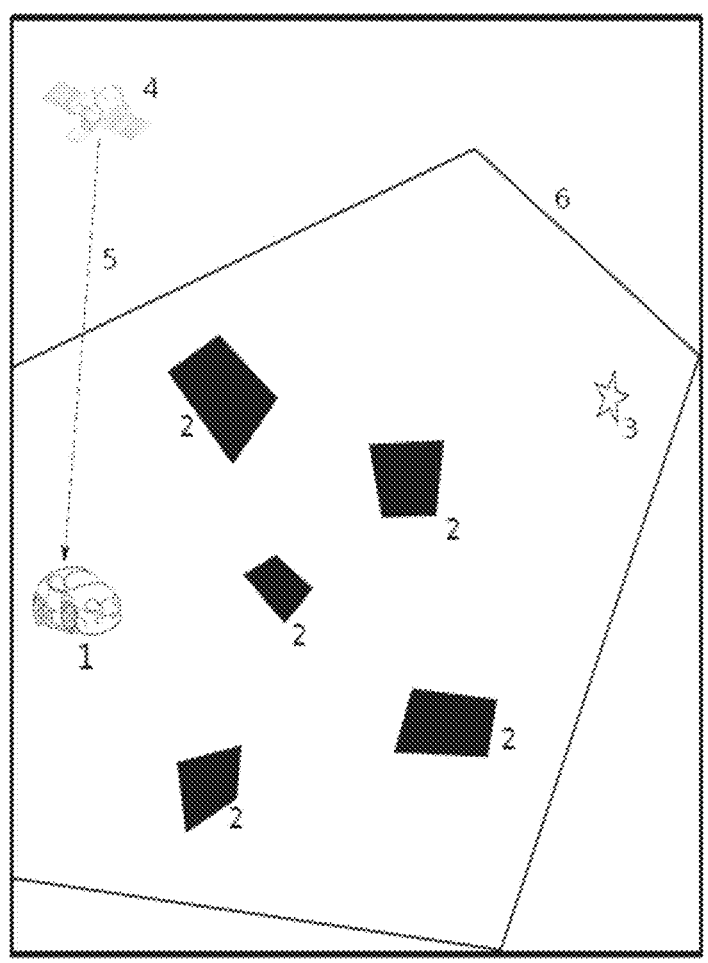
FIG. 13 is a schematic representation of an autonomous car and a destination in a cluttered environment.

FIG. 13 shows an example of an autonomous car (1) that is aiming to reach a destination (3) from its initial position, as shown:

A map of the area is either pre-stored in memory of the controller or is constructed in real time by another component. A map consists of a bounded operating area (6) with obstacles (2) having known coordinates with respect to some global coordinate system.

Figure 14:
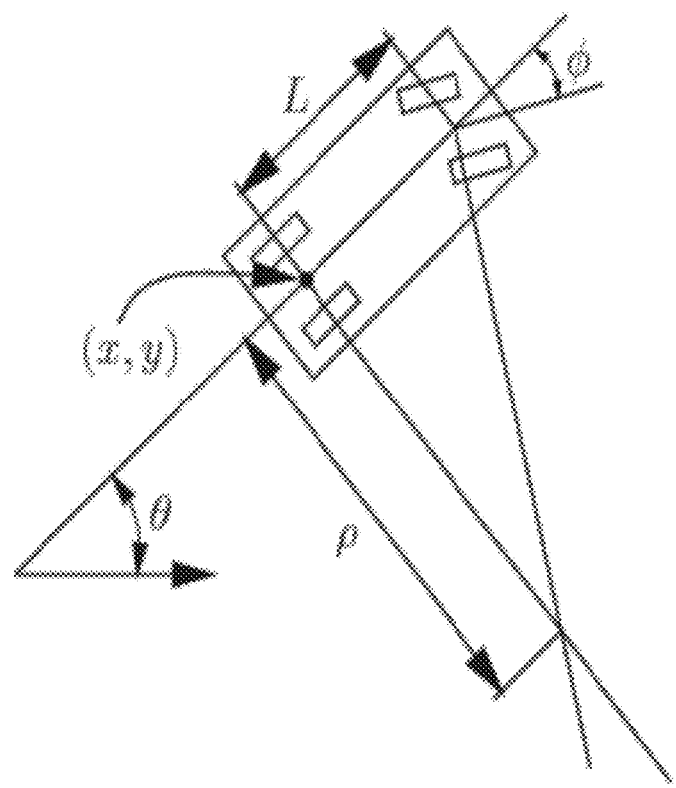
FIG. 14 is a schematic representation of a simple car model.

The nominal dynamics of the car is given, e.g. by a manufacturer, or can be constructed from historical data. In this example (see FIG. 14), the car has the following nominal dynamics:

$$d\begin{bmatrix} x(t) \\ y(t) \\ \theta(t) \end{bmatrix} = \begin{bmatrix} u_s(t)\cos(\theta(t)) \\ u_s(t)\sin(\theta(t)) \\ \frac{u_s(t)}{L}\tan(u_\phi(t)) \end{bmatrix} dt,$$

where (x(t), y(t), θ(t)) is the state of the car that denotes the coordinate (x(t), y(t)) and heading angle θ(t) at time t, L is the length of the car, and u(t)=($u_s$(t), $u_\phi$(t)) are the control signals for the speed s and the steering angle ϕ at time t which causes the car to travel in a circular motion with a radius $$\rho = \frac{L}{\tan(\phi)}.$$

From historical data, which may include data about road quality and engine vibration, or from onboard sensor data, which evaluates in real time road quality and engine vibration, the processor in the controller can estimate uncertainty in the full dynamics:

$$d\begin{bmatrix} x(t) \\ y(t) \\ \theta(t) \end{bmatrix} = \begin{bmatrix} u_s(t)\cos(\theta(t)) \\ u_s(t)\sin(\theta(t)) \\ \frac{u_s(t)}{L}\tan(u_\phi(t)) \end{bmatrix} dt + \begin{bmatrix} \sigma_x(t) & 0 & 0 \\ 0 & \sigma_y(t) & 0 \\ 0 & 0 & \sigma_\phi(t) \end{bmatrix} dw(t), \quad (2)$$

where $\sigma_x$(t), $\sigma_y$(t), and $\sigma_{100}$(t) can be functions of state and control signals at time t, and w(t) is a 3-dimensional standard Brownian motion.

The state of the system (x(t), y(t), ↓(t)) at any time can be estimated reasonably accurately via GPS signals (5) received from GPS satellites (4) or using onboard sensors.

A user enters a destination (3) for the car to reach via a graphical user interface on the car.

The car can be configured to minimize time to reach the goal or to minimize fuel consumption or to be guided by some other goal. A user may have an option to switch between these criteria through a graphical user interface.

A bounded collision probability η can be pre-stored in memory by the manufacturer, for example, as required by some regulatory guideline.

We also examine a hypothetical system with the 2-dimensional single-integrator dynamics:

$$d\begin{bmatrix} x(t) \\ y(t) \end{bmatrix} = \begin{bmatrix} u_x(t) \\ u_y(t) \end{bmatrix} dt + \begin{bmatrix} 0.5 & 0 \\ 0 & 0.5 \end{bmatrix} dw(t), \quad (3)$$

where w(t) is a 2-dimensional standard Brownian motion. The state (x(t), (y(t)) denotes its coordinate at time t, and the control signal u(t)=(u$_x$(t), u$_y$(t)) is its velocity in the x and y directions in which u$_x$(t), u$_y$(t)∈[−1, 1].

The cost function is the weighted sum of total energy spent to reach the goal G, which is measured as the integral of square of control magnitude, and terminal cost, which is 1000 for the goal region and 10 for the obstacle region with a discount factor a α=0.9.

Figure 15:
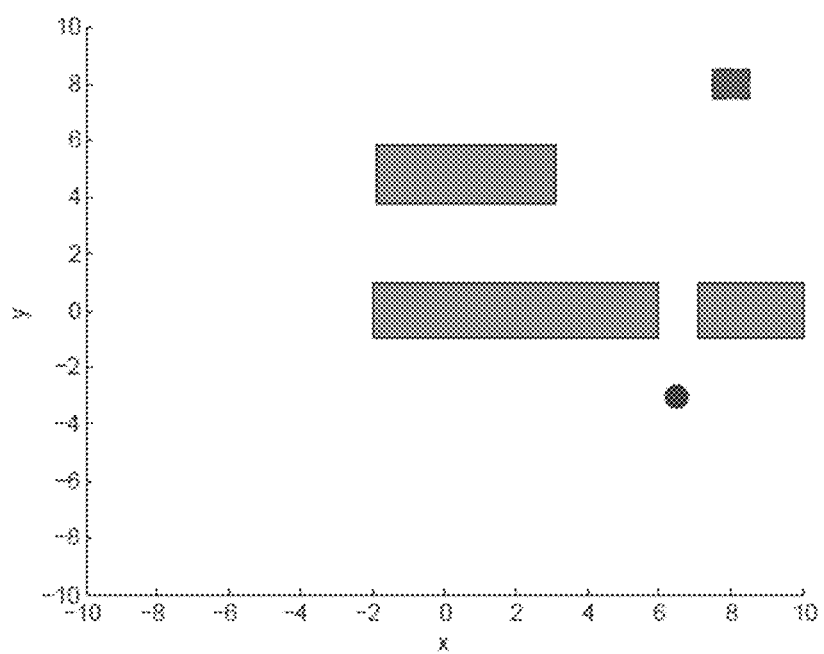
FIG. 15 is a schematic representation of an environment for a single integrator system.

The system operates in a bounded operating area as shown in FIG. 15 and wants to reach a goal at (8,8) from an initial position at (6.5, −3). We set the collision probability threshold η=0.05, which means at most 5% of trajectories from the initial state resulting in collision.

Figure 16:
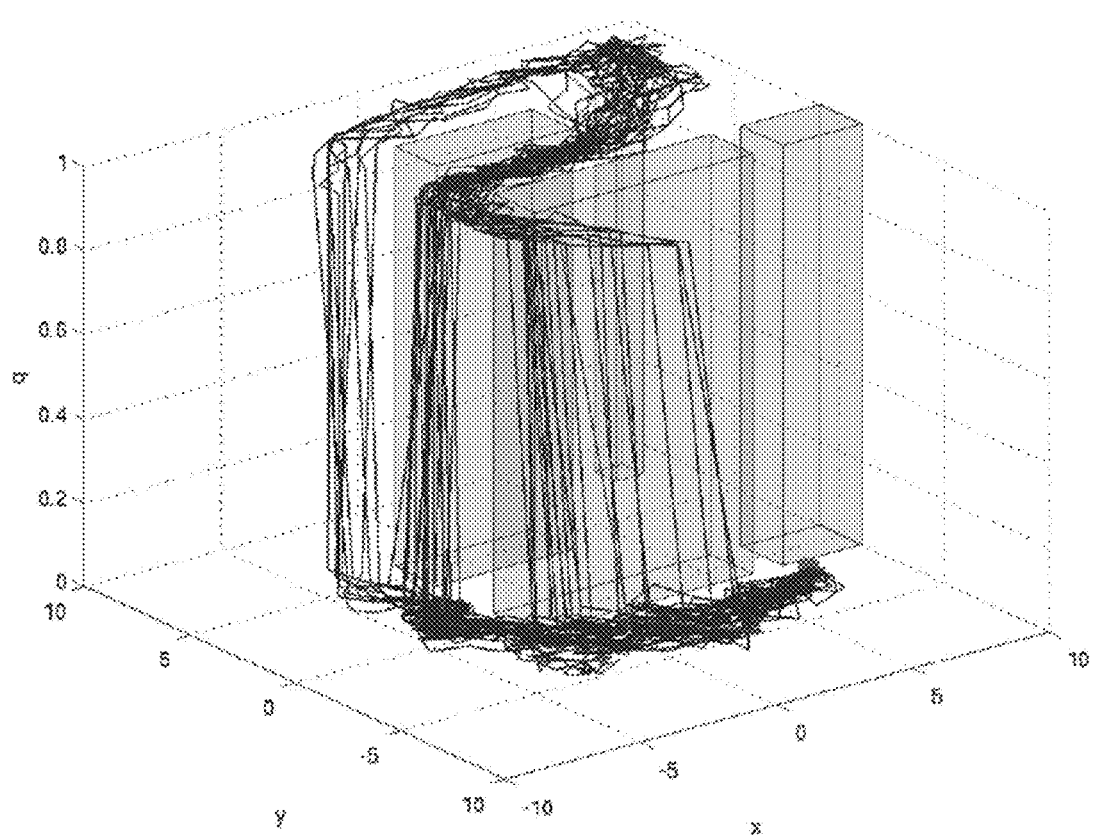
FIG. 16 is a schematic representation showing examples of trajectories for the system in FIG. 15 in an augmented state space.
Figure 17:
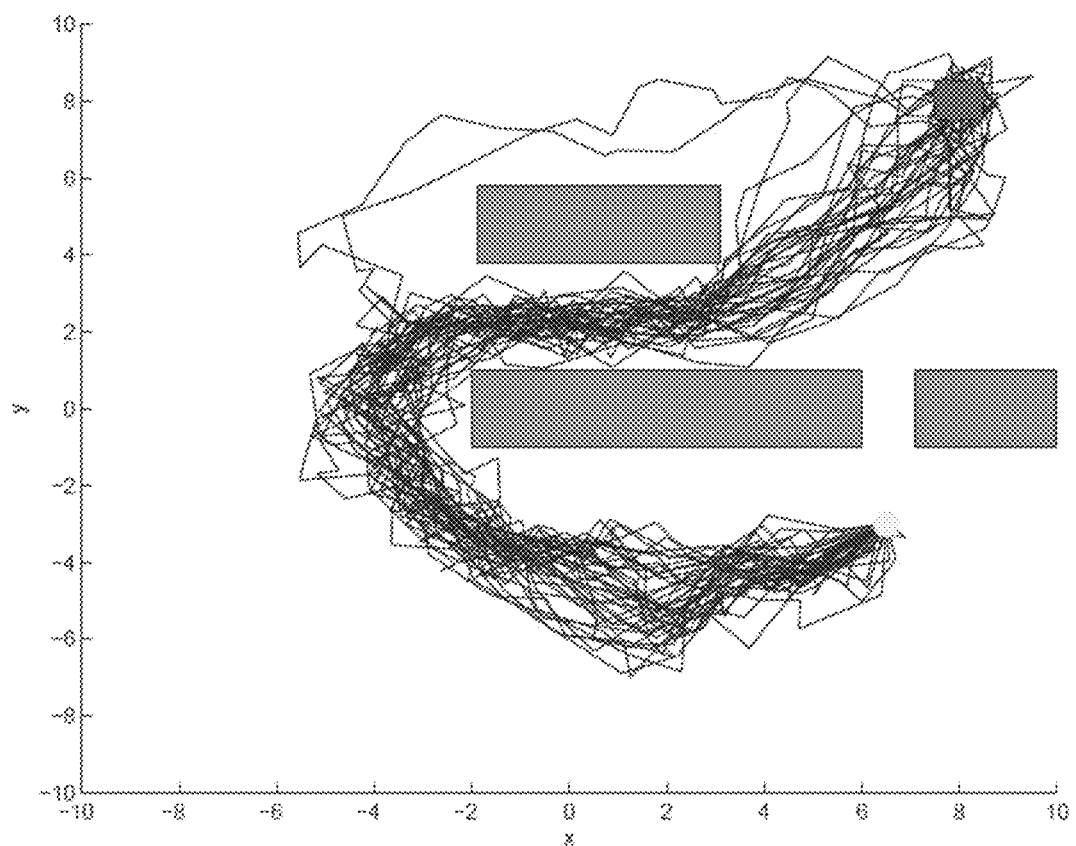
FIG. 17 is a schematic representation showing examples of trajectories for the system in FIG. 15 in an original state space.

FIG. 16 shows an example of 50 simulated trajectories returned by the controller in the augmented state space where the third axis q represent the martingale state component. As we can see, the martingale states vary along the controlled trajectories. In addition, only 2 trajectories result in collision out of 50 trajectories. That is, only 4% of executed trajectories collide with obstacles. These 50 simulated trajectories are shown in the original state space as in FIG. 17.

Figure 18:
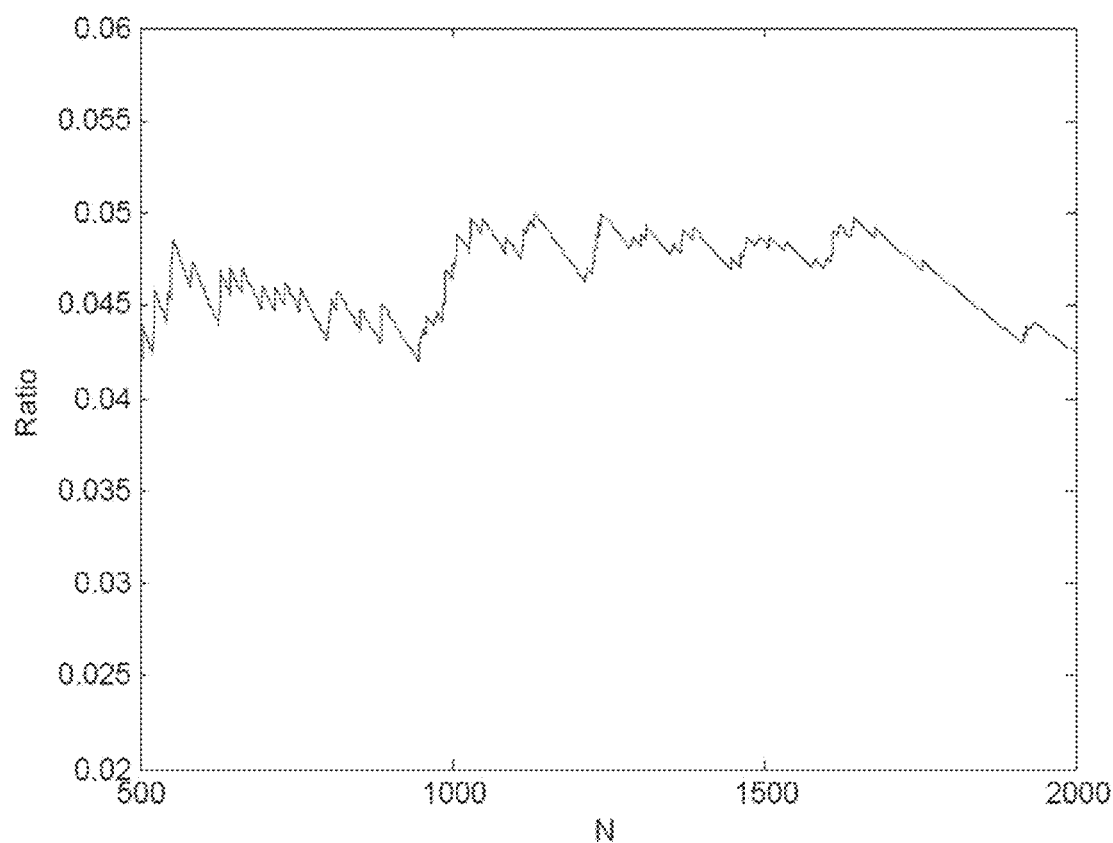
FIG. 18 is a plot showing the ratio of the number of trajectories resulting in collision out of the first N trajectories, where $500 \leq N \leq 2000$.

FIG. 18 shows the ratio of the number of simulated trajectories resulting in collision out of the first N simulated trajectories where 500≤N≤2000. As we can see these ratios varies and belong the range [0.04, 0.05. This result supports the correctness of the controller, A number of embodiments of the invention have been described. Nevertheless, it will be understood that various modifications may be made without departing from the spirit and scope of the invention.

For example, the model(s) describing the dynamics of a system can be substantially enriched to capture new aspects that may affect the behaviors of the system. For example, a jump process is a stochastic process that describes abrupt changes due to shocks during operation. This is one of many new noise models can be added (as additive terms) into the model(s). In some implementations, algorithms to control systems described by these extended models can be built on the basics of iMDP.

In this regard, the controlled diffusion model describing the dynamics referred to herein can be enriched in several ways. For example, noise can be driven by not only Brownian processes but also jump processes, which are stochastic processes that describe abrupt changes due to shocks during operation. In this case, the dynamics can be modeled as:

$$x(t)=x(0)+\int_0^t f(x(\tau), u(\tau))d\tau+\int_0^t F(x(\tau), u(\tau))dw(\tau)+J(t),$$

where the term J(t) produces the jumps. To characterize the jump term, we generally would like to specify the probability that a jump occurs in any small time interval and the distribution of any resulting jumps as the function of the past history process. Between jumps, the term J(t) is constant.

The iMDP algorithm can be further extended to control systems with dynamics that are described by Eq. 1. The local consistency conditions now include the approximation for jump intensities during holding times.

Additionally, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors).

Alternatively, or additionally, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially-generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodi-

What is claimed is:

1. A computer-implemented method for controlling a dynamical system in an uncertain environment within a bounded probability of failure, wherein the dynamical system has a state space and a control space, the method comprising:
diffusing, with at least one computer-based processor, a risk constraint that corresponds to the bounded probability of failure associated with the dynamical system into a martingale that represents a level of risk tolerance associated with the dynamical system over time;
augmenting the state space and the control space of the dynamical system with the martingale to create an augmented model for the dynamical system, wherein the augmented model has an augmented state space and an augmented control space;
if additional time is available before a control signal needs to be returned to the dynamical system, then iteratively constructing one or more Markov Decision Processes (MDPs), wherein each iterative MDP represents an incrementally refined model of the dynamical system, relative to the augmented model and any previously-constructed MDP iteration; and
computing a first solution based on the augmented model or, if additional time was available, based on one of the MDP iterations.

2. The computer-implemented method of claim 1, further comprising returning a first control signal to the dynamical system based on the computed first solution.

3. The computer-implemented method of claim 2, further comprising:
after returning the control signal to the dynamical system based on the computed solution, continuing to iteratively construct one or more additional MDPs, wherein each additional MDP represents a further incrementally refined model of the dynamical system, relative to one or more previously-constructed MDP iterations; and
computing a second solution based on one of the additional MDP iterations.

4. The computer-implemented method of claim 3, further comprising returning a second control signal to the dynamical system based on the computed second solution.

5. The computer-implemented method of claim 4, further comprising:
controlling the dynamical system based on the computed first signal; and
subsequently, controlling the dynamical system based on the computed second signal.

6. The computer-implemented method of claim 1, wherein creating the augmented model transforms controlling the dynamical system from a risk-constrained problem into a stochastic target problem.

7. The computer-implemented method of claim 1, wherein each one of the MDP iterations has an augmented state space and an augmented control space.

8. The computer-implemented method of claim 1, wherein computing the first solution utilizes a rapidly-exploring sampling technique and approximating Markov chains.

9. The computer-implemented method of claim 1, wherein constructing the MDP at each one of the iterations comprises:
sampling from an augmented state space associated with the augmented model or a previously-constructed one of the MDP iterations; and
computing one or more boundary values based on the sampling.

10. The computer-implemented method of claim 1, wherein computing the first solution based on one of the MDP iterations comprises computing the first solution based on a latest one of the MDP iterations.

11. The computer-implemented method of claim 1, further comprising enabling a human to enter the risk constraint, via a computer-based data input device, associated with the dynamical system.

12. The computer-implemented method of claim 1, further comprising:
enabling a human to identify, through a computer-based data input device, a desired final state associated with the dynamical system; and
using the identified, desired final state in the controlling of the dynamical system.

13. A computer-based system comprising:
a controller for a dynamical system to operate in an uncertain environment within a bounded probability of failure, wherein the dynamical system has a state space and a control space;
at least one computer-based processor configured to:
diffuse a risk constraint associated with the dynamical system that corresponds to the bounded probability of failure into a martingale that represents a level of risk tolerance associated with the dynamical system over time;
augment the state space and the control space of the dynamical system with the martingale to create an augmented model for the dynamical system, wherein the augmented model has an augmented state space and an augmented control space;
if additional time is available before a control signal needs to be returned to the dynamical system, then iteratively construct one or more Markov Decision Processes (MDPs), wherein each iterative MDP represents an incrementally refined model of the dynamical system, relative to the augmented model and any previously-constructed MDP iteration; and
compute a first solution based on the augmented model or, if additional time was available, based on one of the MDP iterations.

14. The computer-based system of claim 13, wherein the at least one computer-based processor is further configured to return a first control signal to the dynamical system based on the computed first solution.

15. The computer-based system of claim 14, wherein the at least one computer-based processor is further configured to:
after returning the control signal to the dynamical system based on the computed solution, continue to iteratively construct one or more additional MDPs, wherein each additional MDP represents a further incrementally refined model of the dynamical system, relative to one or more previously-constructed MDP iterations; and
compute a second solution based on one of the additional MDP iterations.

16. The computer-based system of claim 15, wherein the at least one computer-based processor is further configured to return a second control signal to the dynamical system based on the computed second solution.

17. The computer-based system of claim 15, wherein the computer-based controller is configured to: control the dynamical system based on the computed first signal; and subsequently, control the dynamical system based on the computed second signal.

18. The computer-based system of claim 13, wherein each one of the MDP iterations has an augmented state space and an augmented control space.

19. The computer-based system of claim 13, wherein the at least one computer-based processor is configured to compute the first solution by utilizing a rapidly-exploring sampling technique and approximating Markov chains.

20. The computer-based system of claim 13, wherein the at least one computer-based processor is configured to construct the MDP at each one of the iterations by:
sampling from an augmented state space associated with the augmented model or a previously-constructed one of the MDP iterations; and
computing one or more boundary values based on the sampling.

21. The computer-based system of claim 13, further comprising:
a computer-based data input device coupled to the at least one computer-based processor and/or the computer-based controller.

22. The computer-based system of claim 21, wherein the computer-based data input device is configured to enable a human to enter the risk constraint associated with the dynamical system and/or to identify a desired final state associated with the dynamical system.

23. The computer-based system of claim 22, wherein the at least one computer-based processor is configured to use the identified, desired final state in the controlling of the dynamical system.

24. A non-transitory, computer-readable medium that stores instructions executable by at least one computer-based processor to perform the operations comprising:
diffusing a risk constraint associated with a dynamical system that corresponds to a bounded probability of failure into a martingale that represents a level of risk tolerance associated with the dynamical system over time;
augmenting a state space and a control space of the dynamical system with the martingale to create an augmented model for the dynamical system, wherein the augmented model has an augmented state space and an augmented control space;
if additional time is available before a control signal needs to be returned to the dynamical system, then iteratively constructing one or more Markov Decision Processes (MDPs), wherein each iterative MDP represents an incrementally refined model of the dynamical system, relative to the augmented model and any previously-constructed MDP iteration; and
computing a first solution based on the augmented model or, if additional time was available, based on one of the MDP iterations.

* * * * *